United States Patent
Ewald et al.

(10) Patent No.: US 6,777,611 B2
(45) Date of Patent: Aug. 17, 2004

(54) SWITCH/POWER DROP UNIT FOR MODULAR WIRING SYSTEM

(75) Inventors: Michael D. Ewald, Tupelo, MS (US); Eddie Tucker, Jr., Tupelo, MS (US)

(73) Assignee: Genlyte Thomas Group LLC, Louisville, KY (US)

( * ) Notice: Subject to any disclaimer, the term of this patent is extended or adjusted under 35 U.S.C. 154(b) by 0 days.

(21) Appl. No.: 10/193,954

(22) Filed: Jul. 11, 2002

(65) Prior Publication Data

US 2003/0010520 A1 Jan. 16, 2003

Related U.S. Application Data

(60) Provisional application No. 60/304,506, filed on Jul. 11, 2001.

(51) Int. Cl.$^7$ ................................................. H02G 3/08
(52) U.S. Cl. ............................. 174/50; 174/48; 174/58; 174/59; 220/3.8; 439/681
(58) Field of Search ............................... 174/48, 50, 59, 174/58, 60; 439/681, 680, 358; 220/3.8, 402; 248/906

(56) References Cited

U.S. PATENT DOCUMENTS

| | | | |
|---|---|---|---|
| 3,144,502 A | | 8/1964 | Weiss |
| 3,647,934 A | * | 3/1972 | Hurtt ........................ 174/65 R |
| 3,648,878 A | | 3/1972 | Mackay et al. |
| 3,715,627 A | | 2/1973 | D'Ausilio |
| 4,001,571 A | | 1/1977 | Martin |
| 4,043,629 A | | 8/1977 | Brannen |
| 4,146,287 A | | 3/1979 | Jonsson |
| 4,272,689 A | | 6/1981 | Crosby et al. |
| 4,367,417 A | | 1/1983 | Casasanta |
| 4,399,371 A | | 8/1983 | Ziff et al. |
| 4,500,796 A | | 2/1985 | Quin, deceased |
| 4,686,381 A | | 8/1987 | Boteler et al. |
| 4,842,551 A | | 6/1989 | Heimann |
| 4,875,871 A | | 10/1989 | Booty, Sr. et al. |
| 4,918,258 A | | 4/1990 | Ayer |
| 4,924,032 A | | 5/1990 | Akins |
| 4,958,048 A | | 9/1990 | Bell |
| 5,057,647 A | | 10/1991 | Hogden et al. |
| 5,064,385 A | | 11/1991 | Harlow, Jr. |
| 5,096,433 A | | 3/1992 | Boundy |
| 5,149,277 A | | 9/1992 | LeMaster |
| 5,164,544 A | | 11/1992 | Snodgrass et al. |
| 5,375,728 A | | 12/1994 | West |
| 5,675,194 A | | 10/1997 | Domigan |
| 5,679,023 A | | 10/1997 | Anderson, Jr. et al. |
| 5,785,548 A | * | 7/1998 | Capper et al. .............. 439/409 |
| 5,785,551 A | | 7/1998 | Libby |
| 5,811,730 A | | 9/1998 | Rintz |
| 5,819,405 A | | 10/1998 | Marder et al. |
| 5,902,960 A | | 5/1999 | Smith |
| 5,936,199 A | | 8/1999 | Lutz |
| 6,102,733 A | | 8/2000 | Anderson, Jr. et al. |
| 6,166,329 A | * | 12/2000 | Oliver et al. .................. 174/58 |
| 6,383,032 B1 | * | 5/2002 | Gerberding .................. 439/681 |

* cited by examiner

*Primary Examiner*—Dhiru R Patel
(74) *Attorney, Agent, or Firm*—Suzan J. Hixon; Middleton Reutlinger

(57) ABSTRACT

An assembly for connecting a pre-wired electrical device into a modular wiring system. The electrical device is mounted in a junction box having a knockout hole. Device wiring connects the electrical device through the knockout hole to a connector plug. Cable wiring connects a modular wiring system power tap connector to a connector socket. The cable wiring runs through a flexible conduit sheath. A knockout connector is connected to the flexible conduit sheath. The connector plug connects to the connector socket. The major width of the connector plug/socket combination is less than the diameter of the knockout hole such that the connector plug/socket combination may be pushed into the junction box through the knockout hole. The knockout connector can then be attached to the junction box at the knockout hole. The power tap connector housing, flexible conduit sheath, knockout connector and junction box are all made of nonflammable materials.

11 Claims, 15 Drawing Sheets

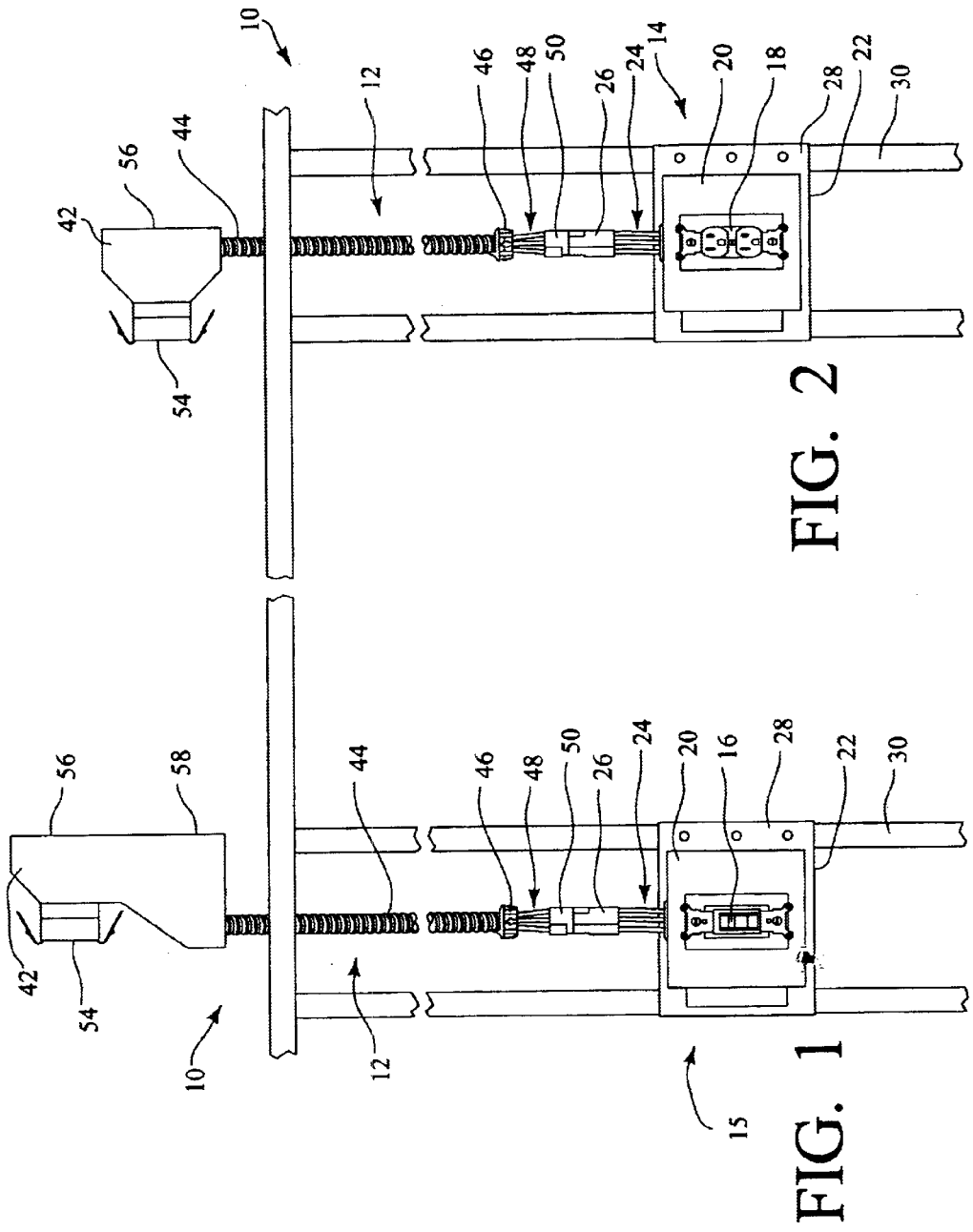

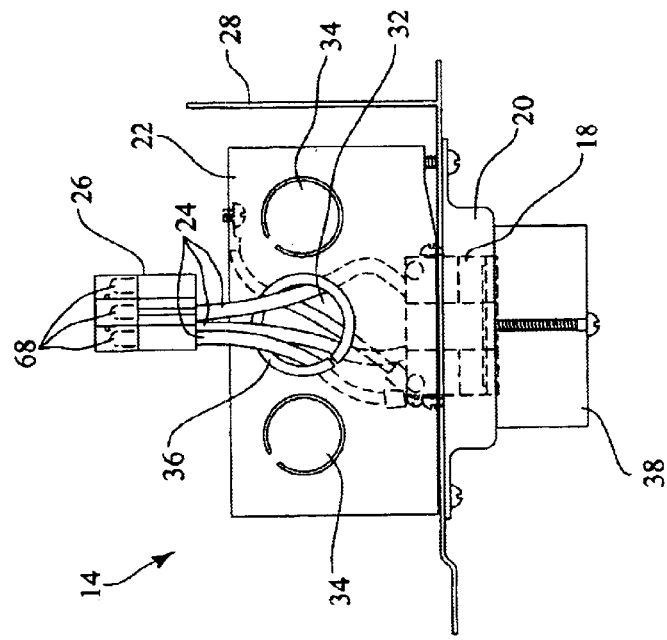
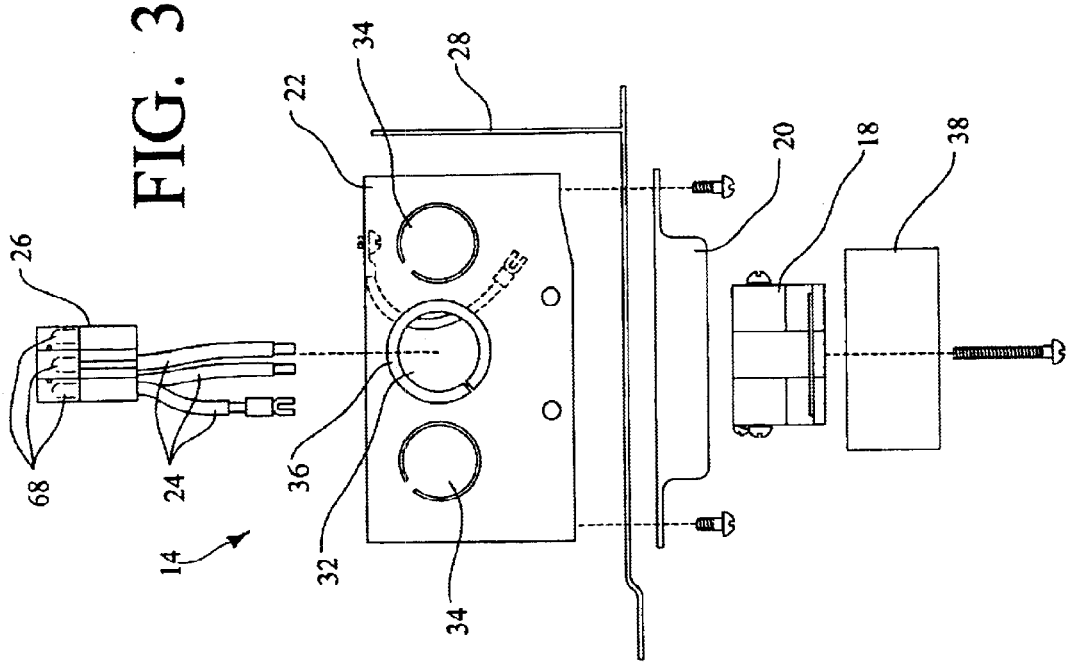

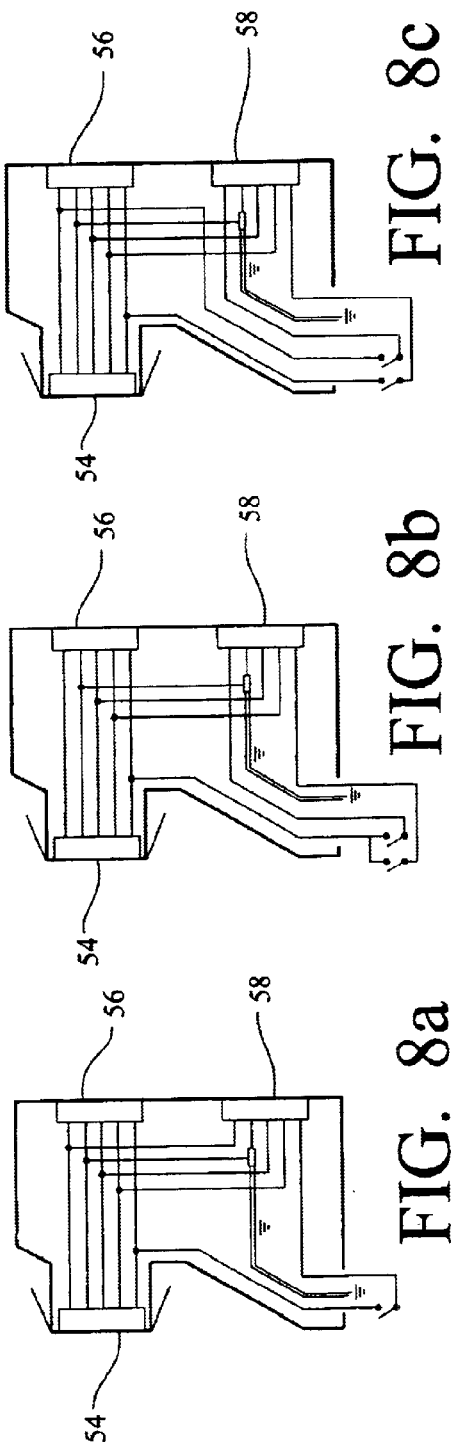
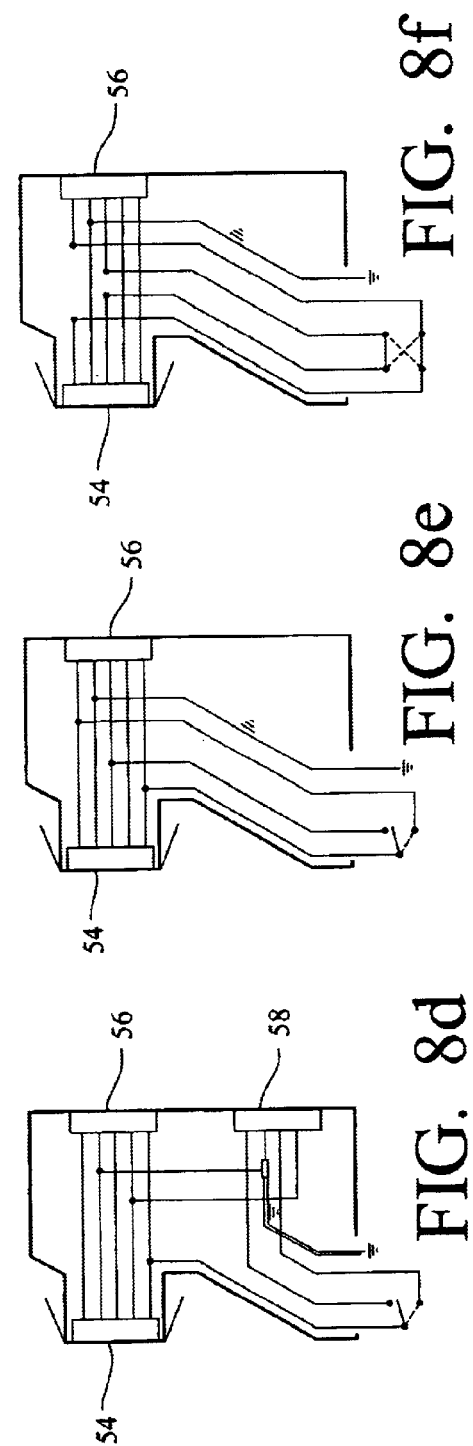

SWITCH/POWER DROP UNIT FOR MODULAR WIRING SYSTEM

CROSS-REFERENCE TO RELATED APPLICATIONS

This application claims the benefit of U.S. Provisional Application No. 60/304,506, filed Jul. 11, 2001.

STATEMENT REGARDING FEDERALLY SPONSORED RESEARCH OR DEVELOPMENT

Not applicable.

REFERENCE TO A "SEQUENTIAL LISTING," A TABLE, OR A COMPUTER PROGRAM LISTING APPENDIX SUBMITTED ON A COMPACT DISC

Not applicable.

BACKGROUND OF THE INVENTION

1. Field of the Invention

This invention relates to modular wiring systems, and particularly to a pre-wired switch/power drop unit for use with a modular wiring system.

2. Description of Related Art

Modular or manufactured wiring systems for commercial and industrial applications were developed to simplify and speed the specification and installation of wiring systems for power distribution and lighting. For example, U.S. Pat. No. 4,500,796 to Quinn describes a system and method of interconnecting multiple lighting fixtures utilizing modular cable assemblies such that wiring to the fixtures and control switches may be readily plugged into place.

However, such modular wiring systems of the prior art have not provided modular solutions for adding convenience wall electrical power receptacles or floor service boxes to the system. Furthermore, modular wiring systems of the prior art have also required that switches be manually wired into the system by a skilled electrician.

Additionally, fire and safety codes require that wiring systems not have any exposed flammable material, requiring that the system components be encased in nonflammable material, such as metal.

Further, wall mounted electrical devices such as power receptacles and light switches slow the installation of wall materials, such as gypsum board or other wall panel materials, requiring tedious measuring, marking and cutting of holes in the wall material for access to the electrical devices.

BRIEF SUMMARY OF THE INVENTION

Thus, it is an object of the present invention to provide a pre-wired switch/power drop unit for use with a modular wiring system.

It is a further object of the present invention to provide a switch/power drop unit which is modular itself, having a cable assembly and an electrical device assembly.

It is even a further object of the present invention to provide a switch/power drop unit which will be enclosed in nonflammable material upon installation, having a flexible conduit cable assembly with a knockout connector and a connector socket, and an electrical device assembly with a junction box and a connector plug, where the connector socket and connector plug may be connected and pushed into the junction box through a knock-out hole allowing the knockout connector to firmly mate with the junction box.

It is yet a further object of the present invention to provide a switch/power drop unit having a protective cover with an exaggerated profile such that the location of the unit will be readily apparent as a bulge under a sheet of wall material during its installation, eliminating the need to measure or otherwise mark the location of the unit and allowing a hole to be easily cut into the wall material for access to the electrical device.

These and other objects are achieved through the use of a novel connector assembly for insertion into a knockout hole of a junction box where the knockout hole has a predetermined diameter. The connector assembly of the invention utilizes a connector plug and a connector socket. The connector plug has a plurality of tubes arranged in a cluster such that a major width of the plug is less than the junction box knockout hole diameter. Likewise, the connector socket has a plurality of barrels sized to be received within the connector plug tubes and arranged in a cluster complementary to the connector plug tube cluster. Thus, the connector plug and connector socket may be connected and inserted through the knockout hole of the junction box.

Further, the connector assembly may contain electrically conductive pins and mating sleeves which may be received in the respective connector plug tubes and connector socket barrels. Appropriate wiring may be attached to the pins and sleeves.

Still further, the connector plug may have a rib formed therein, and the connector socket may have a clasp formed therein for engaging the connector plug rib.

In another embodiment, the objects are achieved with an assembly for connecting a pre-wired electrical device into a modular wiring system, with the assembly having an electrical device assembly and a cable assembly.

The electrical device assembly has a junction box having a knockout hole, with the knockout hole having a predetermined diameter and the junction box being made of non-flammable material. The electrical device is mounted in the junction box. Device wiring is operatively connected to the electrical device, and extends through the knockout hole. The device wiring is also connected to electrically conductive pins, which are received in the tubes of a connector plug. The connector plug tubes are arranged in a cluster such that a major width of the connector plug is less than the junction box knockout hole diameter.

The cable assembly has a power tap connector which is configured to mateably connect with the modular wiring system. The power tap connector has an outer housing which is made of a nonflammable material. Cable wiring operatively connects the power tap connector to electrically conductive sleeves in a connector socket. The electrically conductive sleeves are sized to receive and contact the electrically conductive pins of the electrical device assembly. The connector socket has a plurality of barrels sized to be received within the connector plug tubes. The connector socket barrels are arranged in a cluster which is complementary to the connector plug tube cluster. A flexible conduit sheath is positioned around the cable wiring. The flexible conduit sheath is made of a nonflammable material and is mechanically connected to the power tap connector outer housing at one end and has a knockout connector at the other end.

Thus, the cable assembly connector socket may be connected to the electrical device assembly connector plug and pushed into the junction box such that the electrical device is properly connected to the modular wiring system and the system components are encased in nonflammable materials.

Additionally, a removable split bushing may be used to cover the edges of the knockout hole.

A protective cover may be attached to the electrical device assembly over the electrical device such that the cover creates a bulge under the installation of wall board material. By making the cover of a material that is resistant to incidental contact with a cutting tool, an opening may be formed in the wall board by cutting the wall board at the location of the bulge and following the perimeter of the protective cover.

The elements outlined herein are given primarily for the purpose of better understanding of the present invention. Many additional inventive concepts will be understood herein and none of these objectives are to be considered as limiting without taking into consideration the entirety of the teachings of the figures and specification together with any appended claims.

BRIEF DESCRIPTION OF THE SEVERAL VIEWS OF THE DRAWINGS

FIG. 1 shows a front view of a switch drop unit of the present invention.

FIG. 2 shows a front view of a power drop unit of the present invention.

FIGS. 8a–8f are sample schematic diagrams for the cable assembly of the switch drop unit of FIG. 1.

DETAILED DESCRIPTION OF THE INVENTION

Figure 4A:
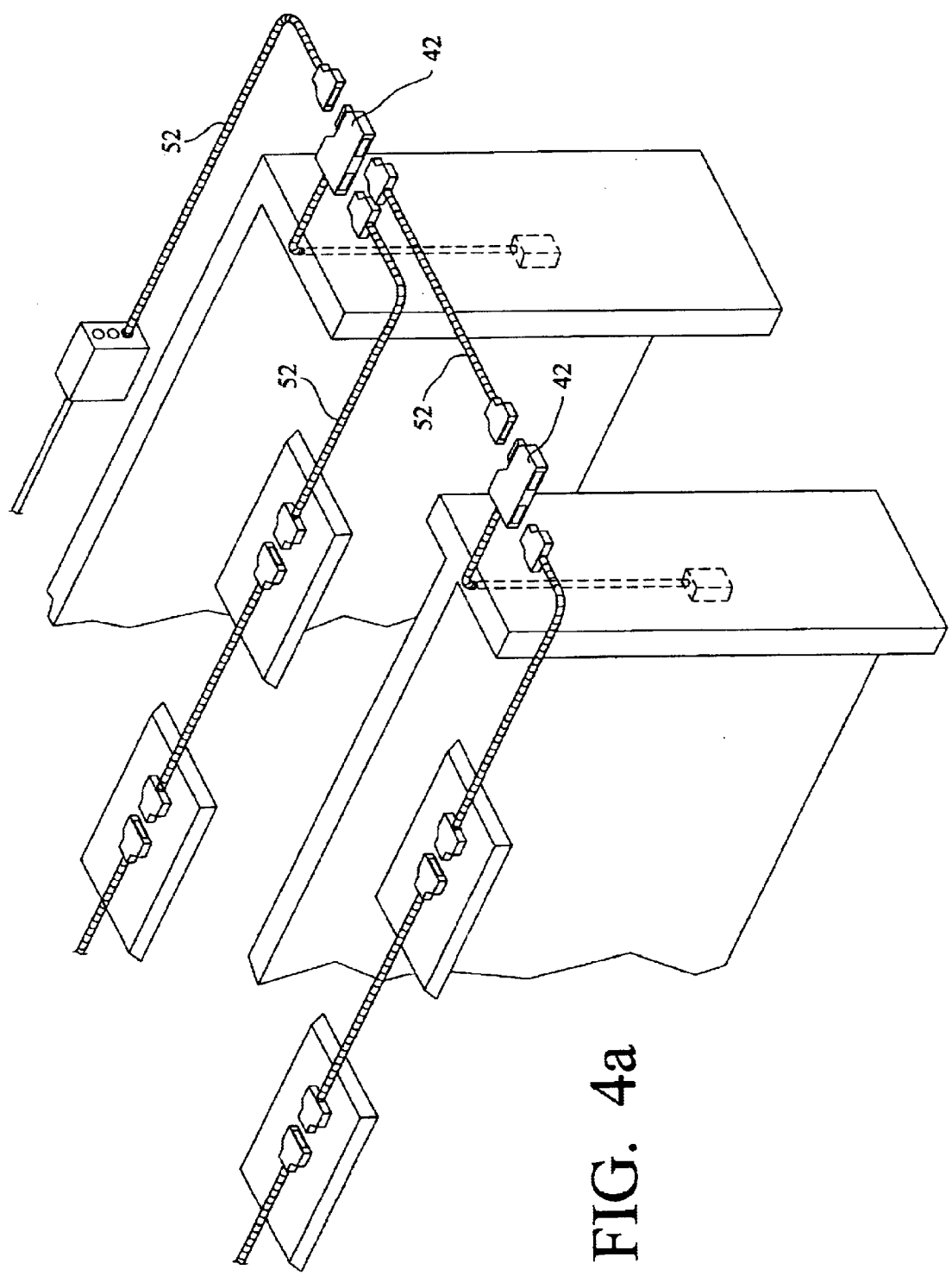
FIG. 4a is a partial perspective of a modular wiring system utilizing the switch drop unit of FIG. 1.

As shown in FIGS. 1 and 2, the switch/power drop unit 10 of the present invention has a cable assembly 12 and an electrical device assembly 14, 15. In the embodiments shown, the electrical device of the electrical device assembly 14, 15 is either an electrical switch 16, such as a light switch, or a power receptacle 18. Thus, FIG. 1 shows a switch drop unit 15, and FIG. 2 shows a power drop unit 14. One of skill in the art will recognize that the inventive principles taught herein will apply to electrical device assemblies employing other electrical devices as well.

A. Electrical Device Assembly—Power Drop Unit

The power drop unit, shown in FIG. 2, has an electrical device assembly 14 with a power receptacle 18.

Figure 3A:
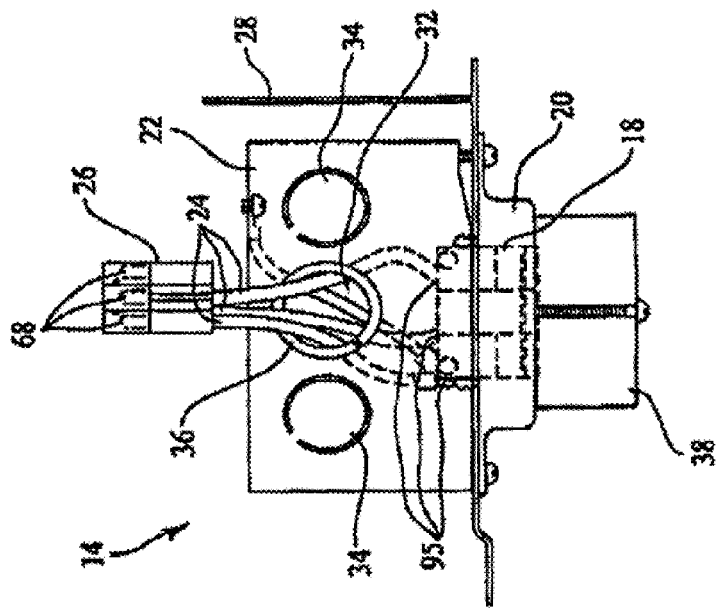
FIG. 3a is an top view with selected portions shown in phantom of the electrical device assembly of the power drop unit of FIG. 2.
Figure 3:
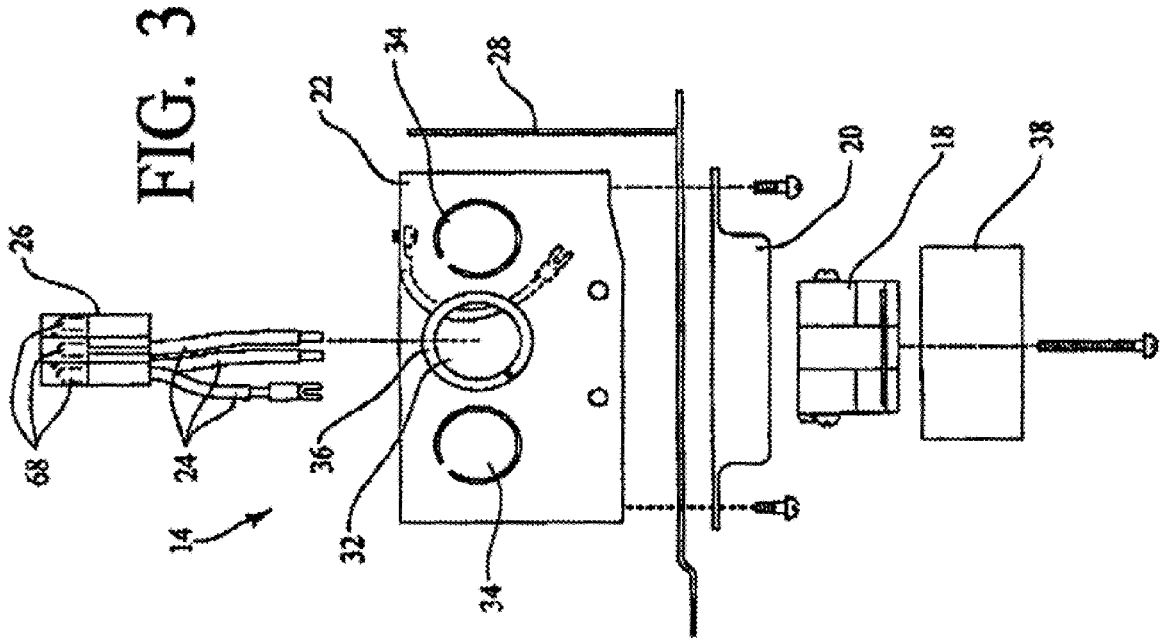
FIG. 3 shows an exploded top view of a portion of an electrical device assembly of the power drop unit of FIG. 2.
Figure 5A:
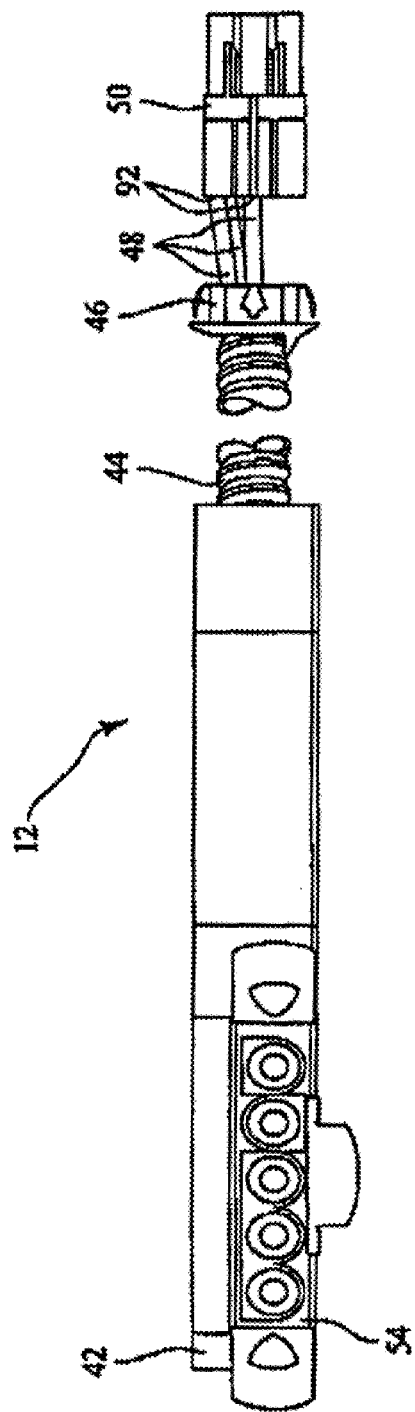
Figure 5B:
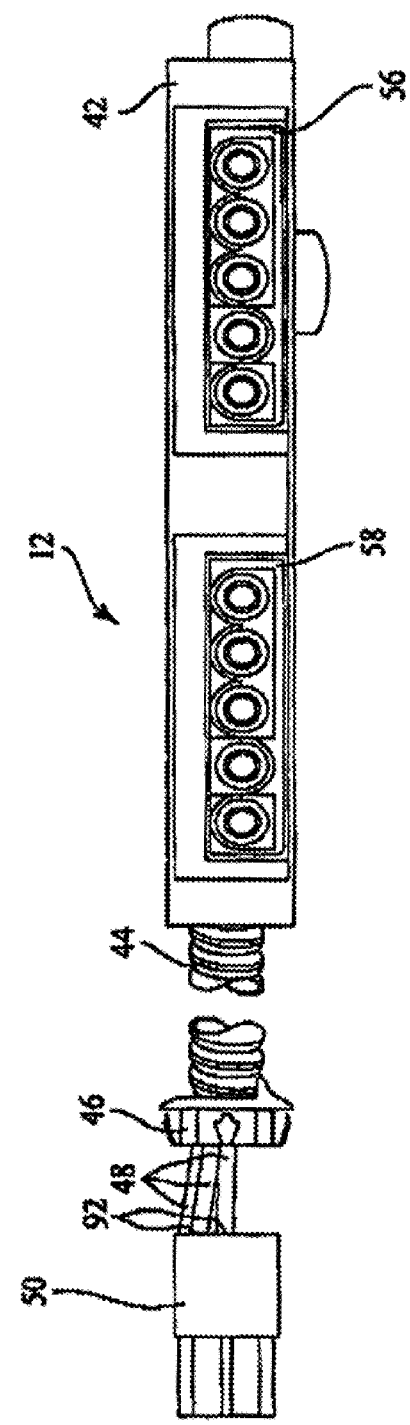
Figure 6A:
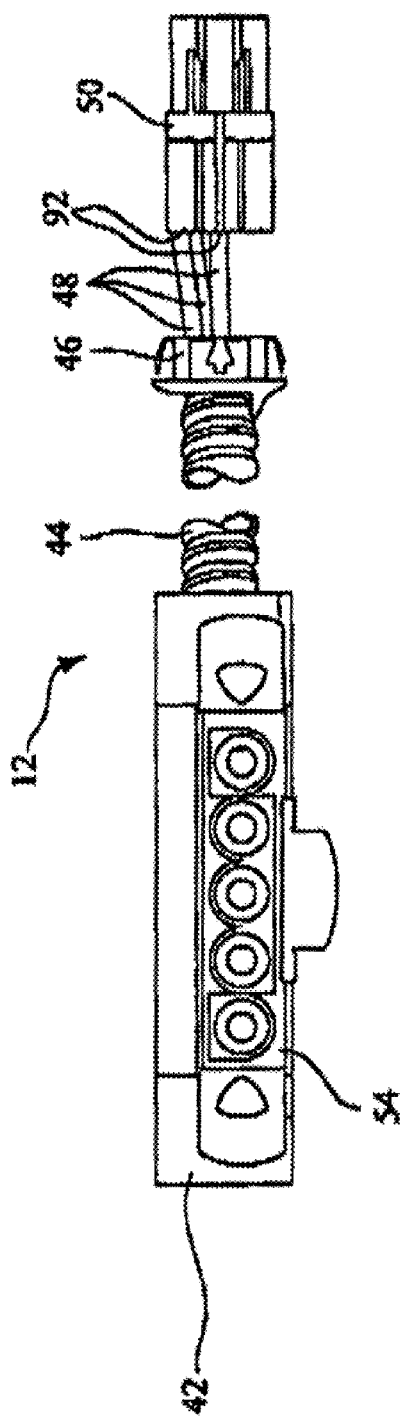
Figure 6B:
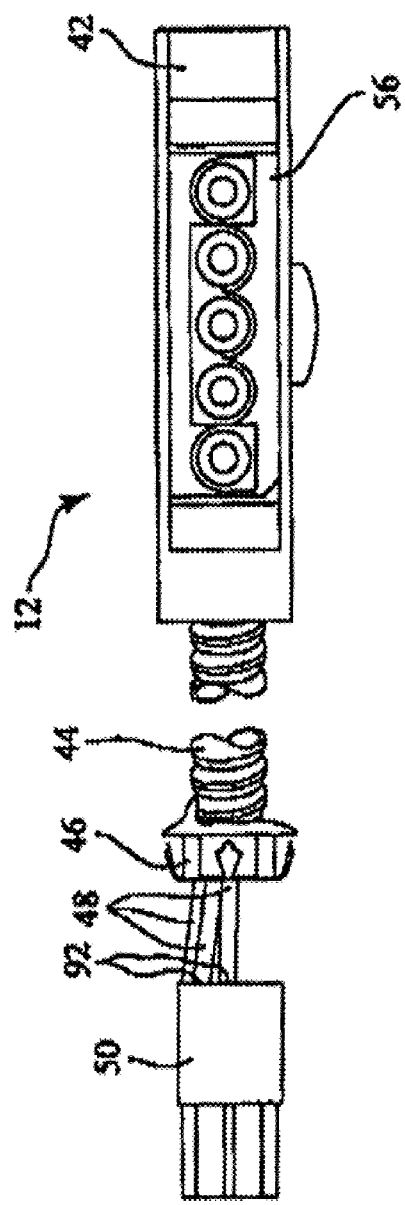
Figure 11C:
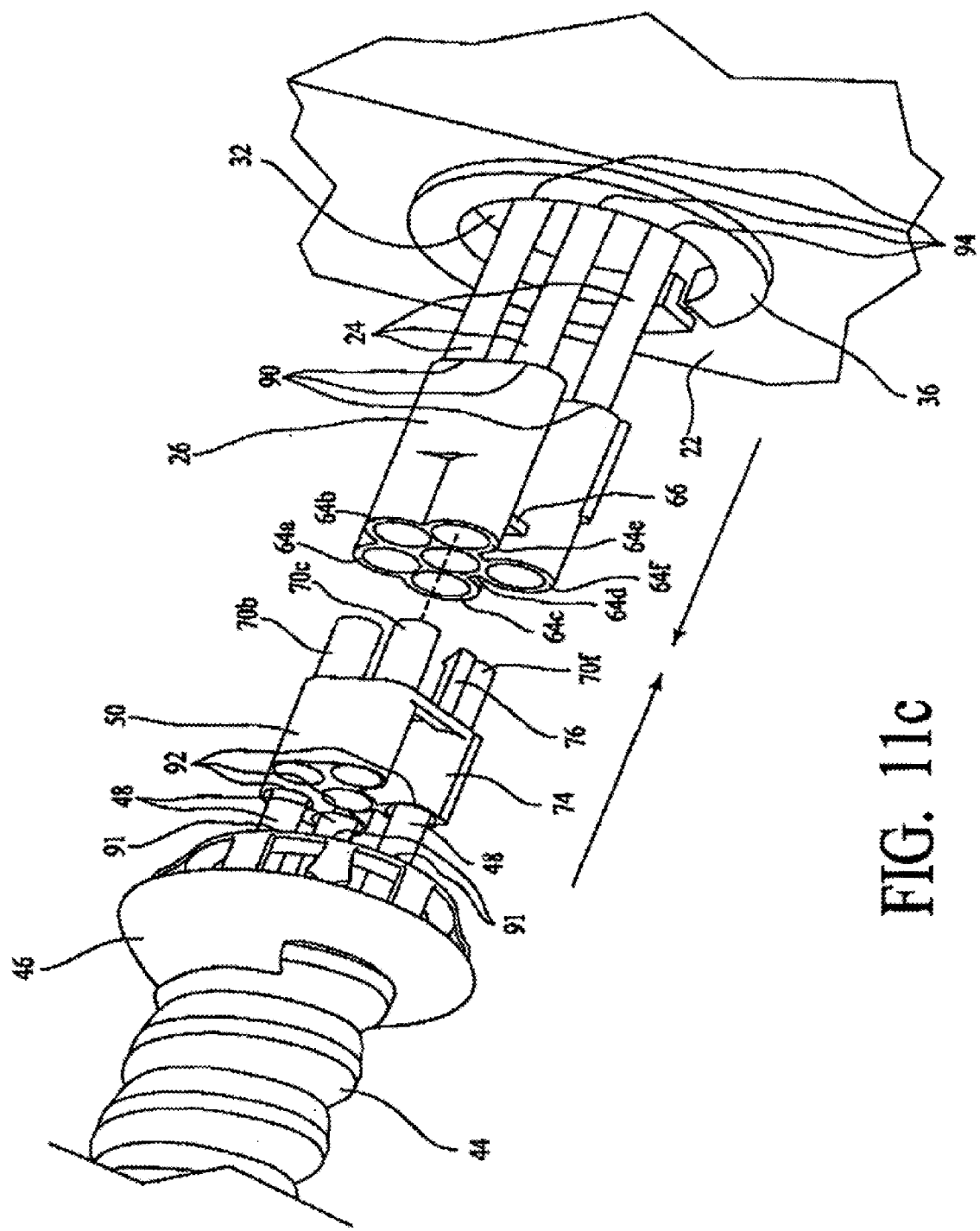
Figure 11D:
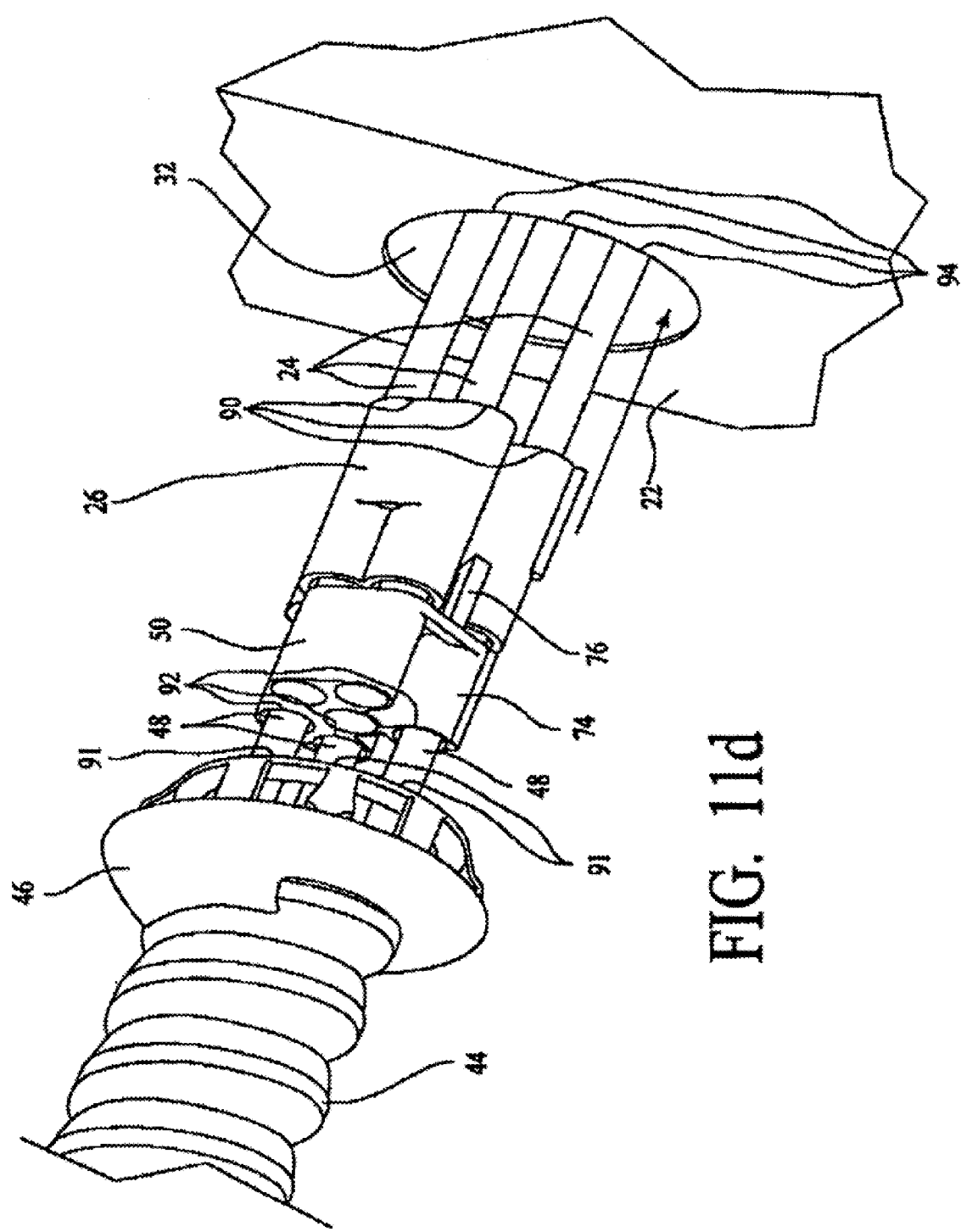
Figure 12:
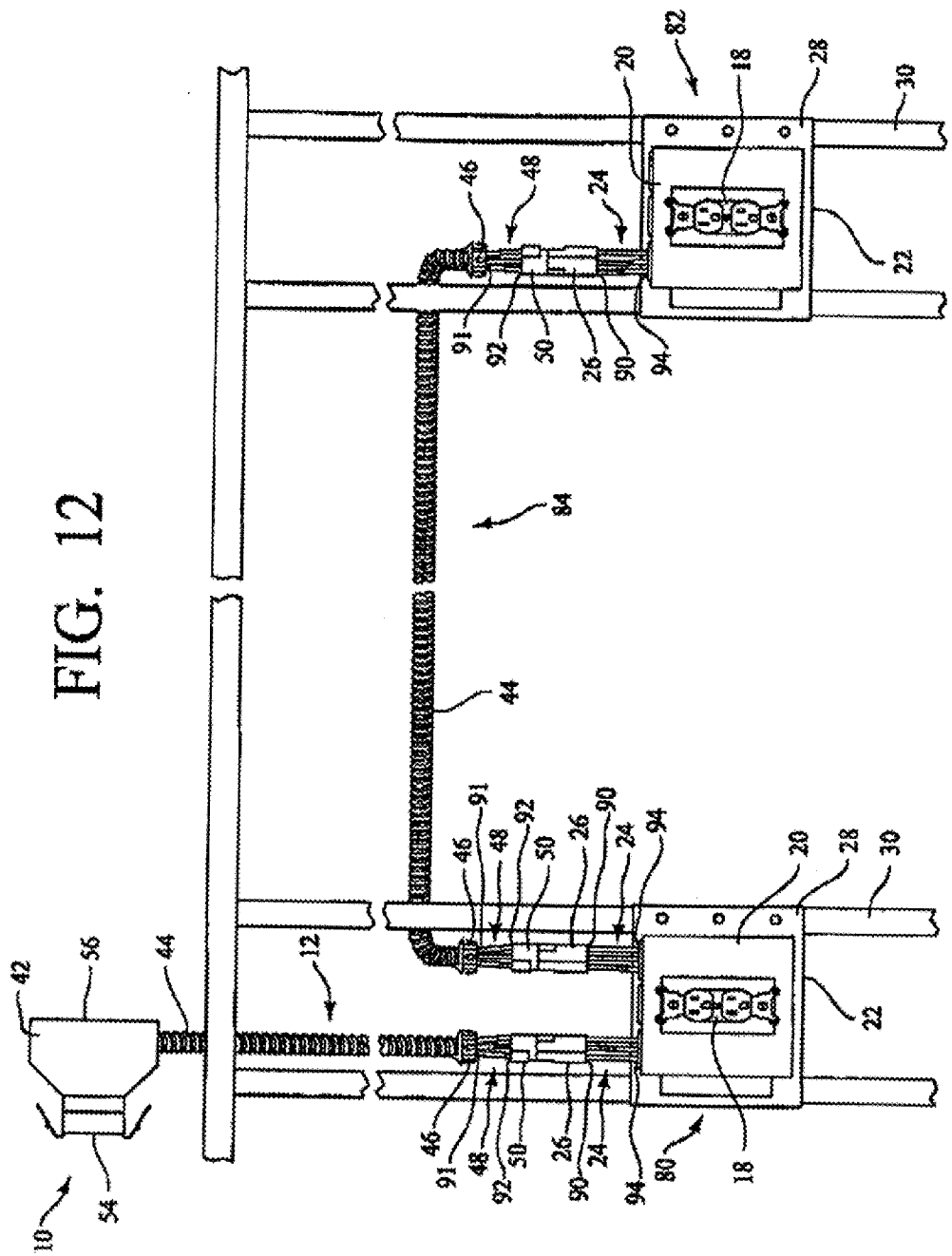
Figure 3A:
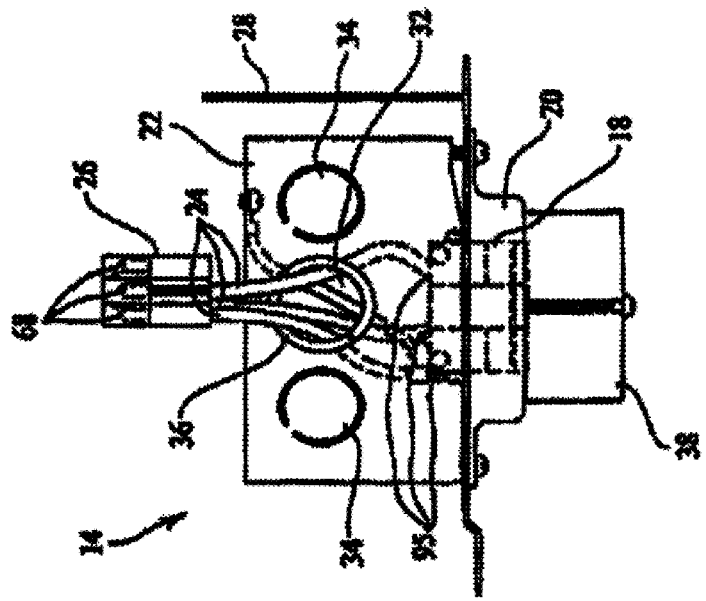
Figure 3:
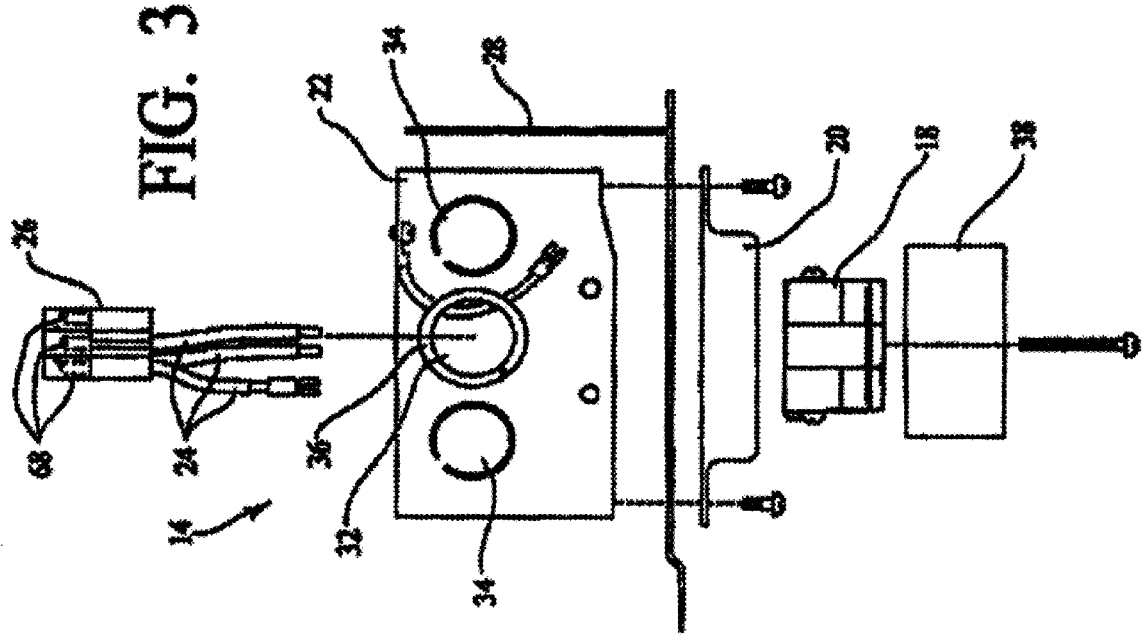
Figure 5A:
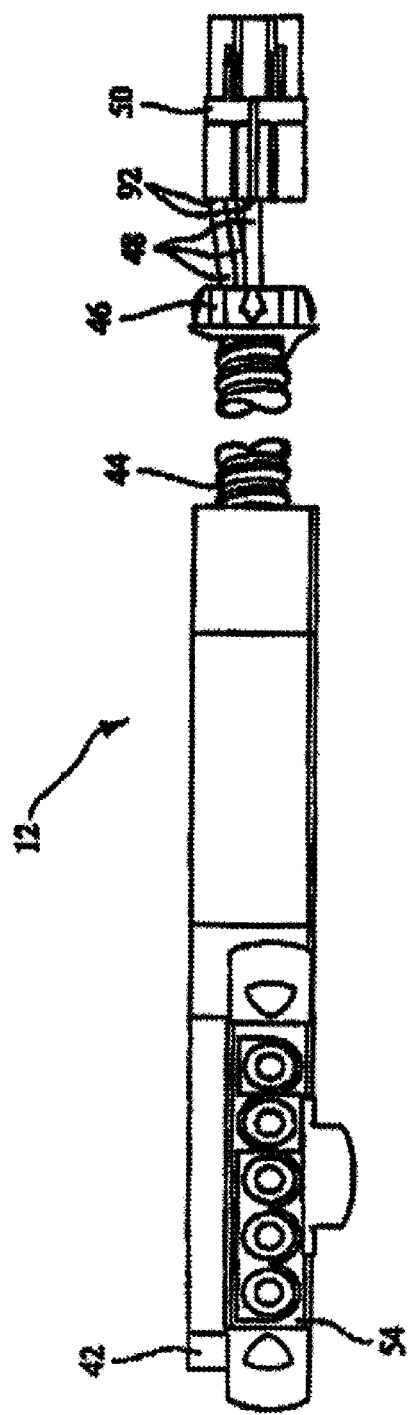
Figure 5B:
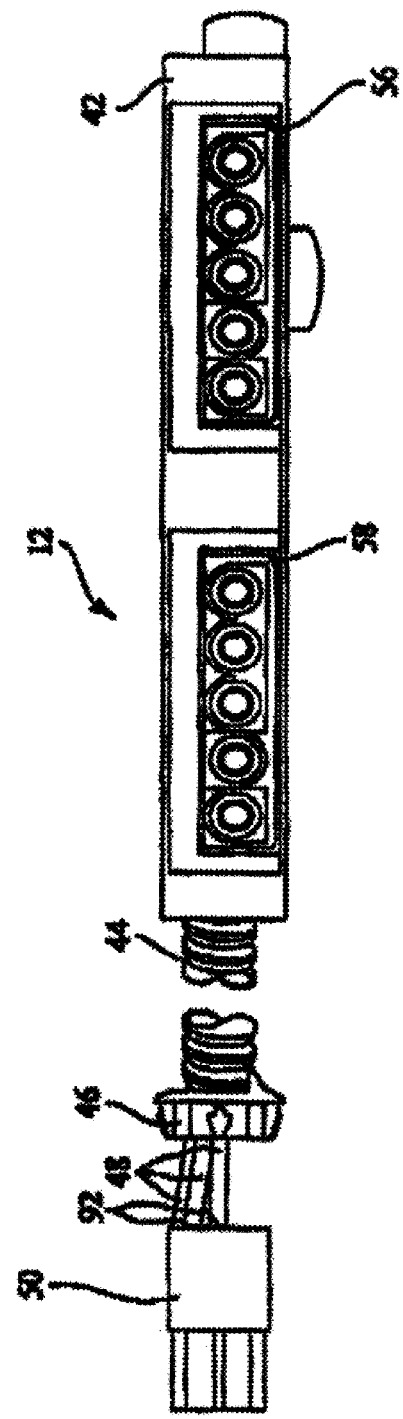
Figure 6A:
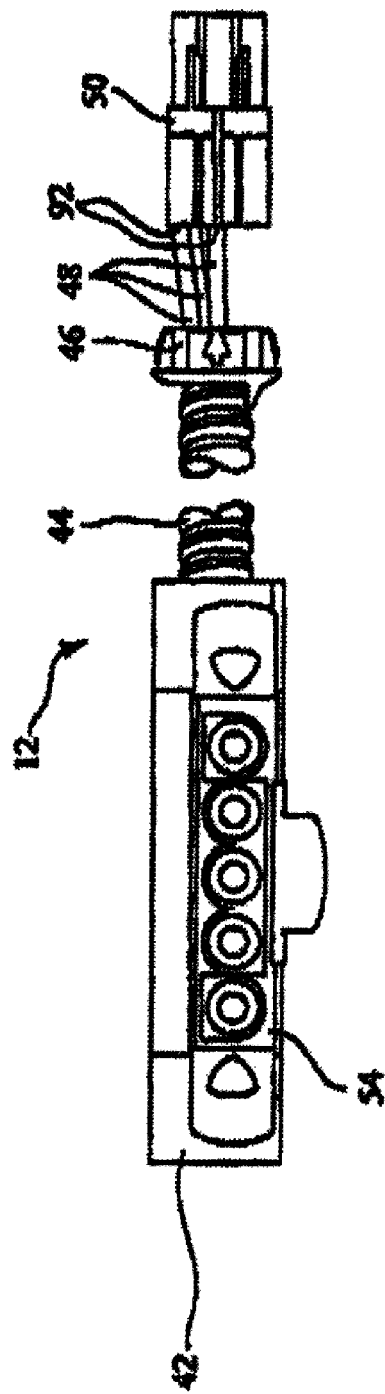
Figure 6B:
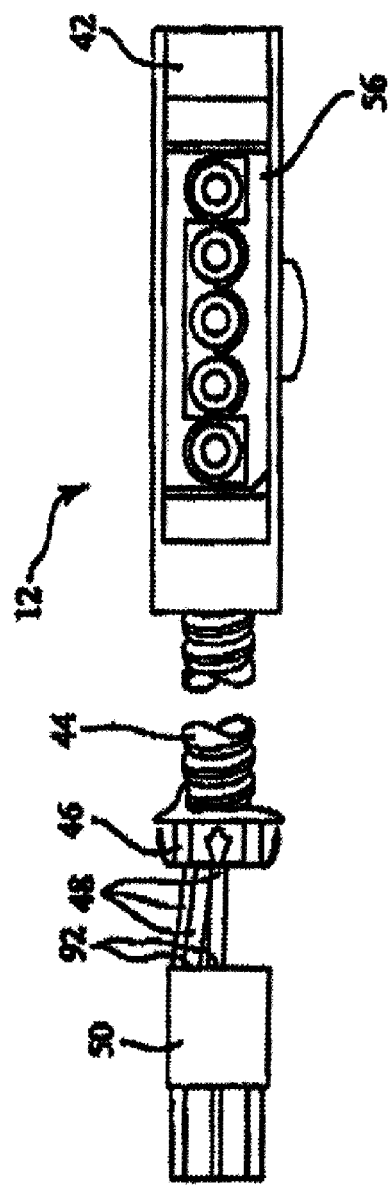
Figure 11C:
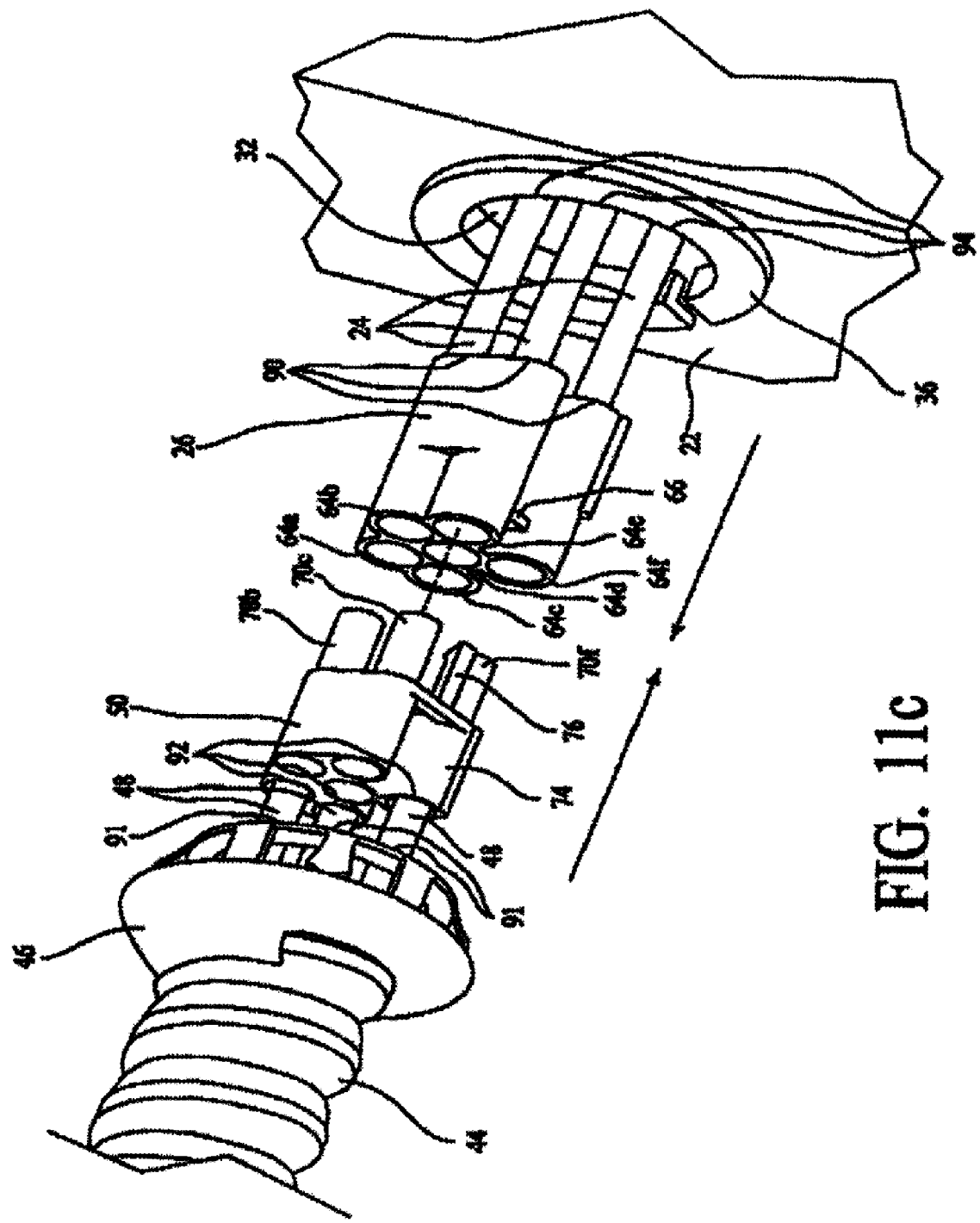
Figure 11D:
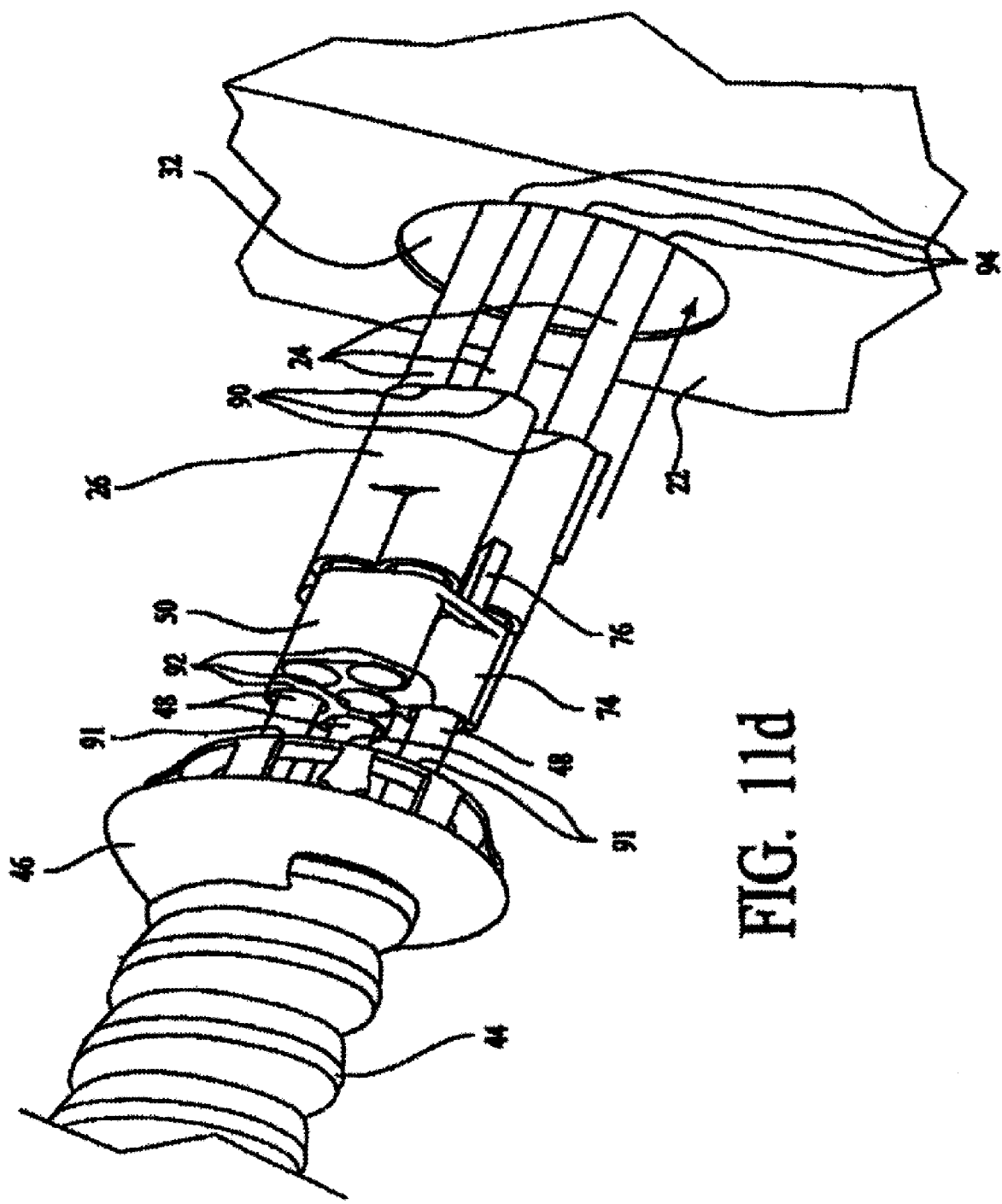

As best shown in FIG. 3, the power receptacle 18 is attached to a plaster ring cover 20. The plaster ring cover 20, in turn, is attached to a junction box 22. Further, the junction box 22 is attached to and supported by a bracket 28.

The junction box 22 is made of a nonflammable material, such as sheet metal, and serves as an enclosure for the power receptacle 18, having, generally, sides, a closed back, and an open front. Thus, the power receptacle 18 is contained substantially within the junction box 22.

Returning to FIG. 2, it is seen that the bracket 28 may be used to secure the electrical device assembly 14 to a stud 30 or other structural member of a building. Thus, the bracket 28 facilitates easy mounting of the electrical device assembly 14 to a building structural member.

As seen in FIG. 3, the junction box 22 also has at least one knockout hole 32 in at least one of the junction box sides. The knockout hole 32 is created by the removal of a knockout tab 34, as shown. The knockout hole 32 has a predetermined diameter, generally ⅞" which is common in the industry, for the acceptance of conduit and other wiring connectors.

Device wiring 24 electrically connects the appropriate terminals 95 on the power receptacle 18 at a first end 94 of the device wiring 24 to electrically conductive pins 68 in the connector plug 26 at a second opposed end 90 of the device wiring 24. Device wiring 24 extends through the knockout hole 32 such that the connector plug 26 is located external to the junction box 22, in order to facilitate easy access to the connector plug 26.

To protect the device wiring 24 from potentially sharp edges of the knockout hole 32, the electrical device assembly 14 preferably has a bushing 36 installed along the edges of the knockout hole 32. However, the bushing 36 may be split for easy removal by the installer.

B. Electrical Device Assembly—Switch Drop Unit

The switch drop unit, shown in FIG. 1, also has an electrical device assembly 15. The switch drop unit electrical device assembly 15 is identical in all respects to the power drop unit electrical device assembly 14 except for the substitution of a switch 16 (FIG. 1) for the power receptacle 18 (FIG. 2). Thus, the switch drop unit electrical device assembly 15 is also attached to a plaster ring cover 20, which, in turn, is attached to a junction box 22. Device wiring 24 connects the appropriate terminals on the switch 16 to pins in the connector plug 26. The junction box 22 is attached to and supported by a bracket 28, which may be used to secure the electrical device assembly 15 to a stud 30 or other building structural member.

Further, it should be understood that the switch drop unit electrical device assembly junction box 22 also has a knock-out hole 32, knock-out tabs 34, and a bushing installed along the edges of the knock-out hole, as shown in FIG. 3 for the power drop unit electrical device assembly junction box 22. The device wiring 24 of the switch drop unit electrical device assembly 15 extends through the knock-out hole 32 such that the connector plug 26 is located external to the junction box 22, to facilitate easy access to the connector plug 26.

Thus, the electrical device assembly 14, 15 of these described embodiments of the present invention may be shipped with the power receptacle 18, or the switch 16, pre-installed in the junction box 22 and pre-wired to the connector plug 26 to create a pre-assembled modular electrical device assembly 14, 15. It should be readily apparent that additional embodiments of the invention may be created by utilizing additional or alternate electrical devices without departing from the spirit or scope of the invention claimed hereinafter.

C.—Cable Assembly

Figure 7:
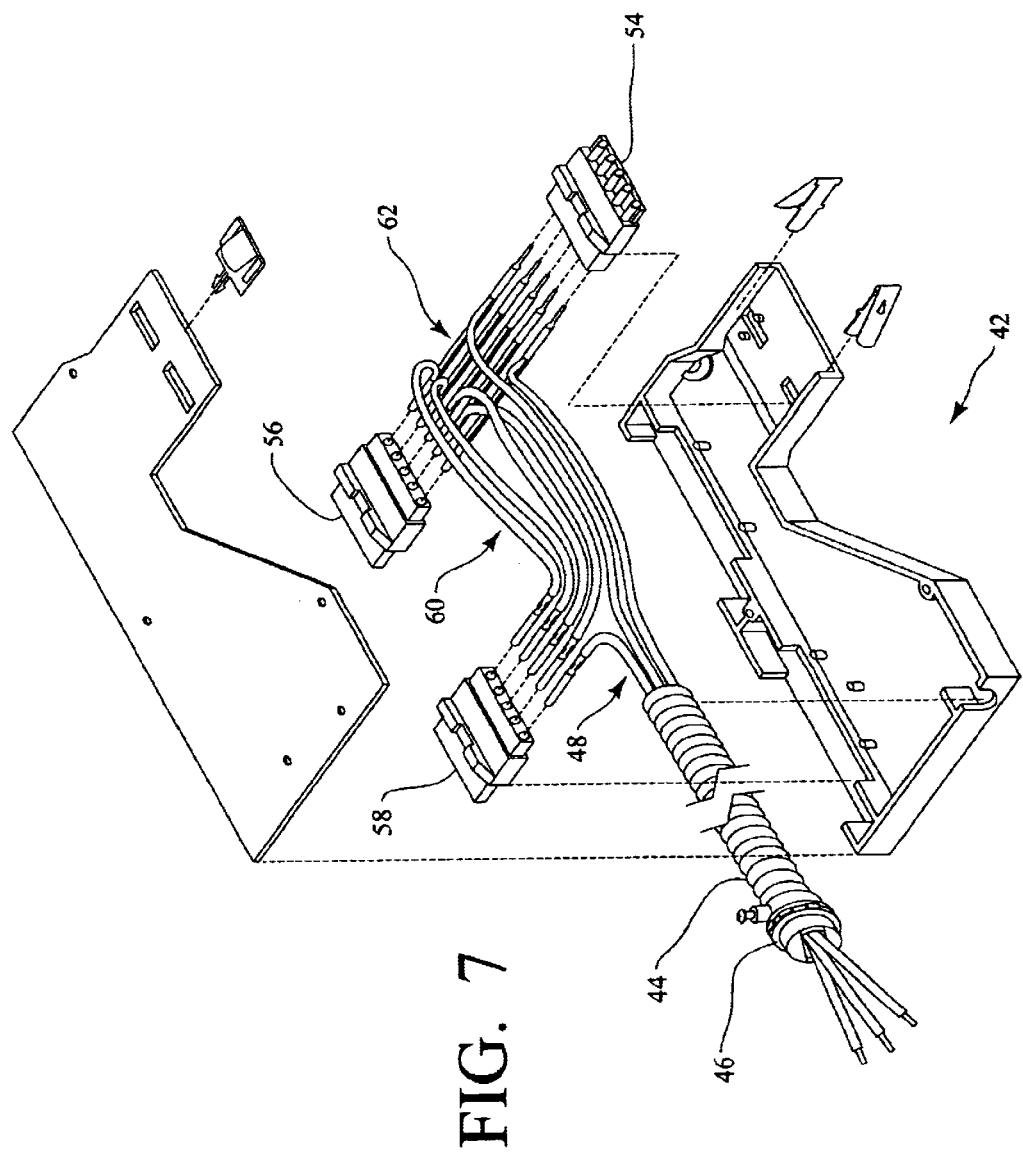
FIG. 7 is an exploded perspective view of a cable assembly of the switch drop unit of FIG. 1.
Figure 9:
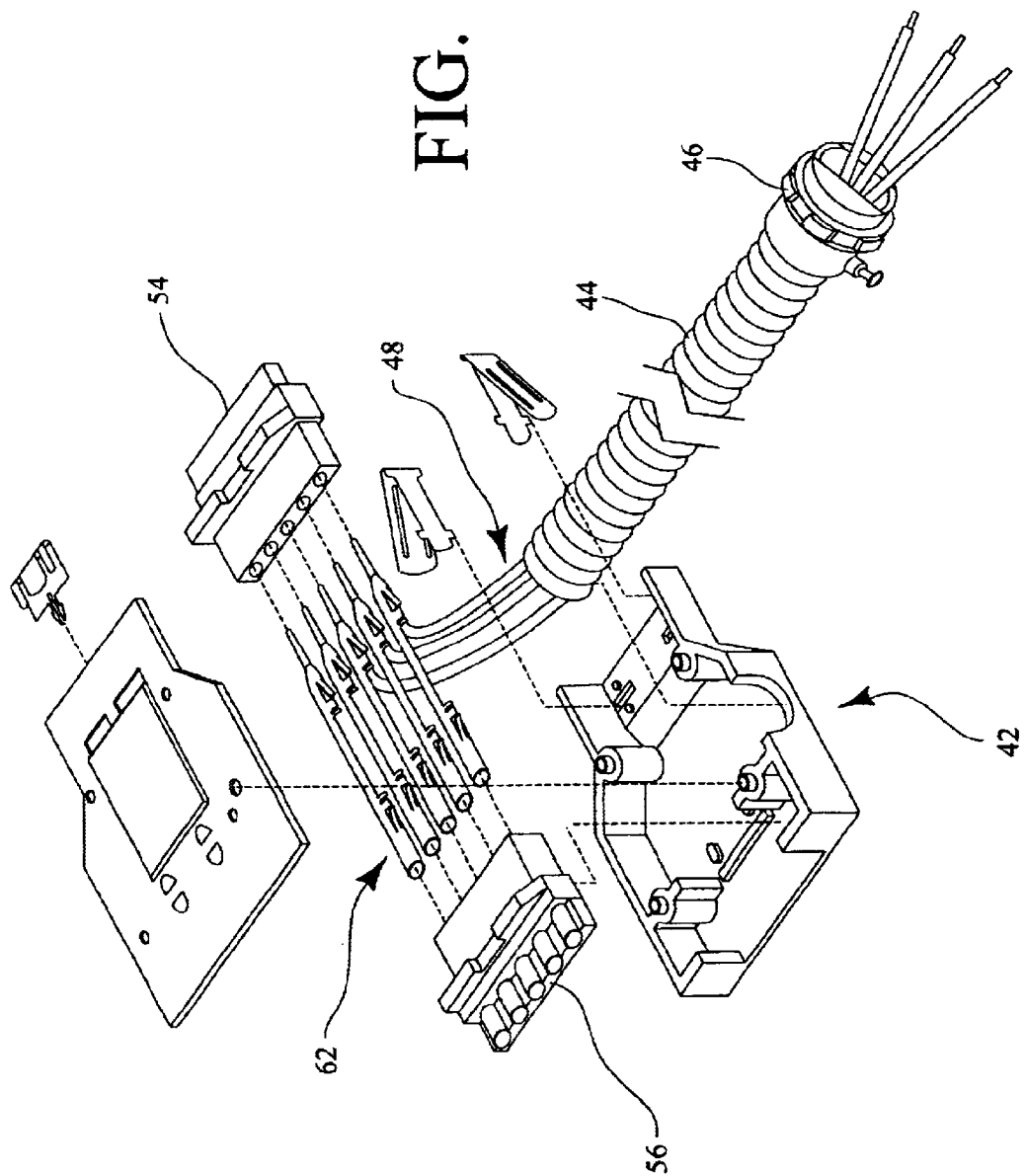
FIG. 9 is an exploded perspective view of a cable assembly of the power drop unit of FIG. 2.

As shown in FIGS. 1 and 2, the cable assembly 12 of the invention has a power tap connector 42, a flexible conduit sheath 44, a knockout connector 46, cable wiring 48, and a connector socket 50. The power tap connector 42 has an outer housing which is made of a nonflammable material. The power tap connector 42 connects to the connector socket 50 via the cable wiring 48. The cable wiring 48 has first ends 91 and opposed second ends 92. The first ends 91 of the cable wiring 48, shown in FIGS. 7 and 9, are operatively connected to the power tap connector 42. The cable wiring 48 runs through a flexible conduit sheath 44, as shown. The flexible conduit sheath 44 is mechanically attached at a first end to the outer housing of the power tap connector 42. A knockout connector 46, for connecting the flexible conduit sheath 44 to the junction box at the knockout hole 32, is attached to an opposed second end of the flexible conduit sheath 44. The flexible conduit sheath 44 and the knockout connector 46 are made of a nonflammable material, preferably metal.

Figure 4B:
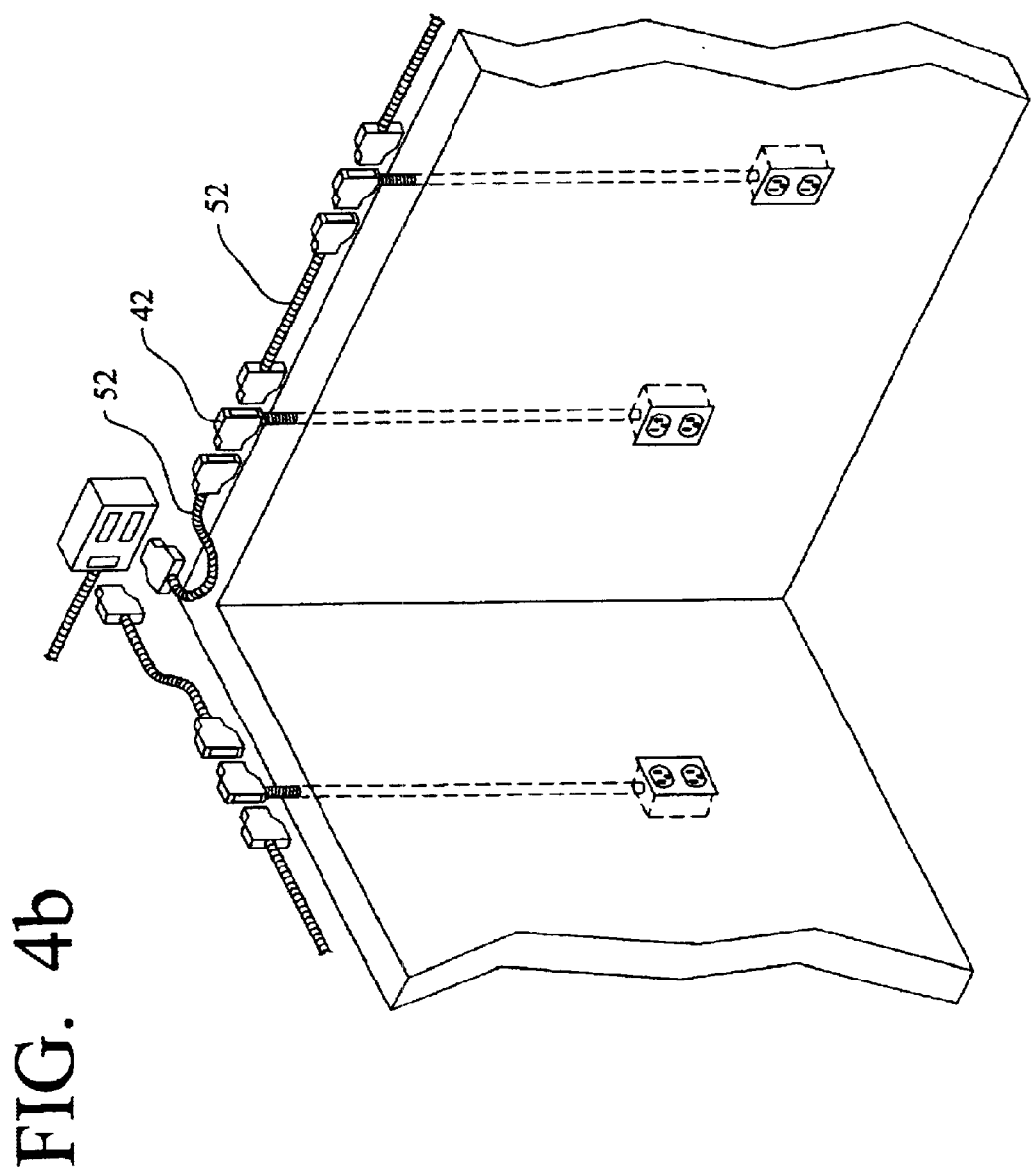
FIG. 4b is a partial perspective of a modular wiring system utilizing the power drop unit of FIG. 2.

As shown in FIGS. 4a and 4b, the power tap connector 42 mateably connects with the power distribution cables 52 of a modular wiring system. FIG. 4a shows the switch drop unit embodiment of the present invention, while FIG. 4b shows the power drop unit embodiment of the invention.

Returning to FIGS. 1 and 2, it is seen that the power tap connector 42 has a power input plug 54 and a pass through power output socket 56. Further, the power tap connector 42 of the switch drop unit contains a switched power output socket 58.

Figure 5A:
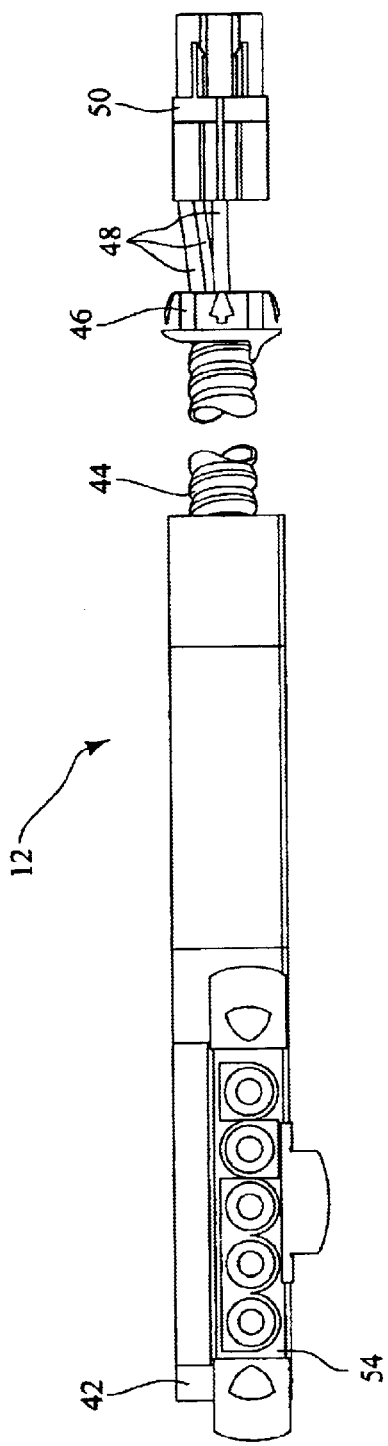
FIG. 5a is a left side view of a portion of a cable assembly of the switch drop unit of FIG. 1.
Figure 5B:
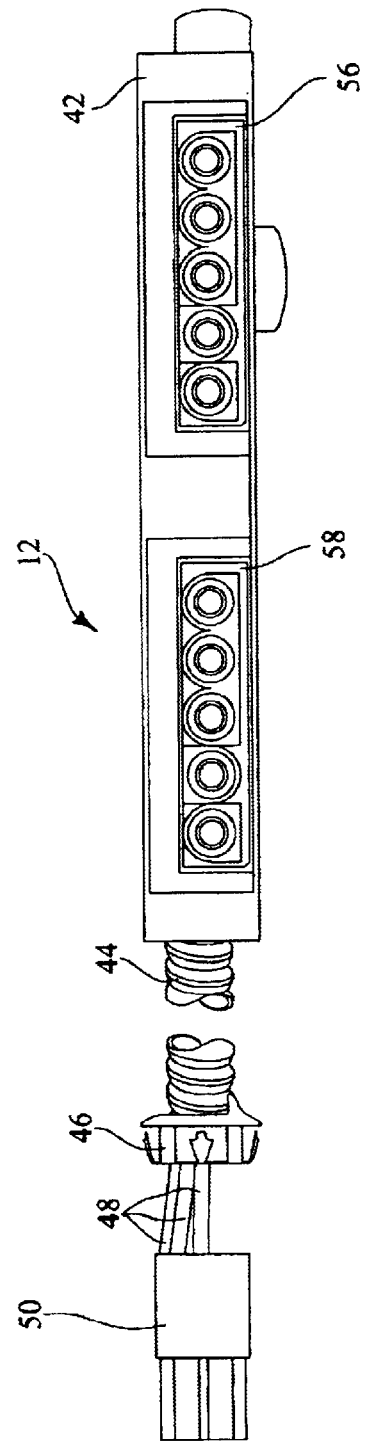
FIG. 5b is a right side view of a portion of a cable assembly of the switch drop unit of FIG. 1.
Figure 6A:
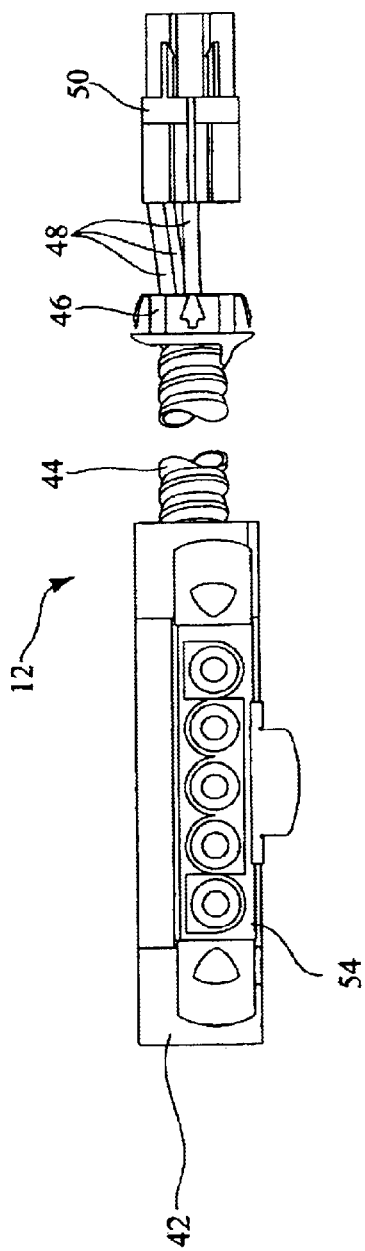
FIG. 6a is a left side view of a portion of a cable assembly of the power drop unit of FIG. 2.
Figure 6B:
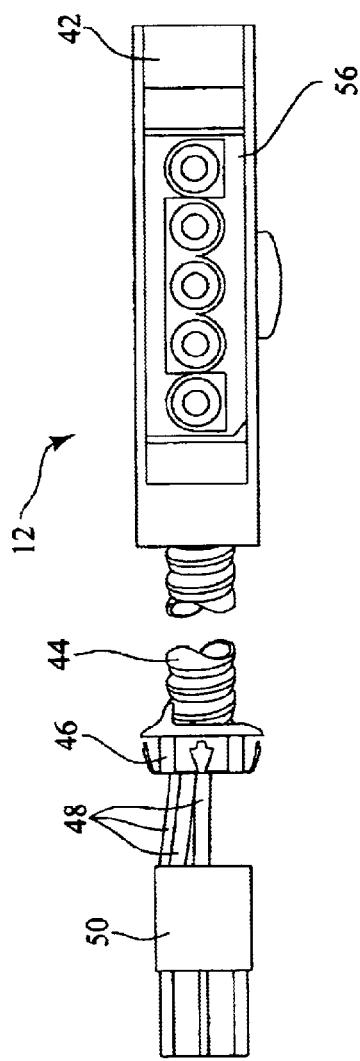
FIG. 6b is a right side view of a portion of a cable assembly of the power drop unit of FIG. 2.

As best shown further in FIG. 5a, for the switch drop unit, and FIG. 6a, for the power drop unit, each of the power input plugs 54 accommodates up to five separate connections. As further shown in FIG. 5b, for the switch drop unit, and FIG. 6b, for the power drop unit, each of the power output socket 56, 58 also accommodates up to five separate connections.

As shown further in FIGS. 7 and 8, for the switch drop unit, and FIGS. 9 and 10, for the power drop unit, multiple wiring configurations are achievable with the described embodiments.

For example, the switch drop unit power tap connector 42 shown in FIG. 7 may be configured for a single level switching circuit, as shown in FIG. 8a, by connecting cable wiring 48 and jumper wiring 60 to the pass through connectors 62 between the power input plug 54, the power output socket 56, and the switched power output socket 58 as shown in the figures.

Further, the switch drop unit power tap connector may be configured, for example, for a multi-level switch (FIG. 8b), a 2 circuit switch (FIG. 8c), a first 3-way switch (FIG. 8d), a second 3-way switch (FIG. 8e), a 4-way switch (FIG. 8e), as well as other circuits.

Figure 10A:
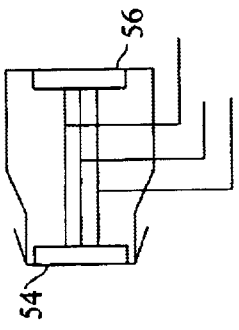
FIGS. 10a–10f are sample schematic diagrams for the cable assembly of the power drop unit of FIG. 2.
Figure 10B:
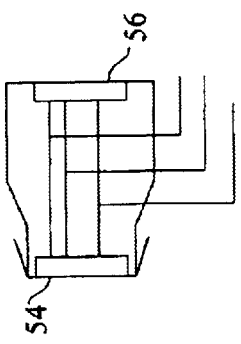
Figure 10C:
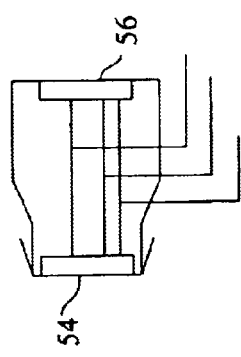
Figure 10D:
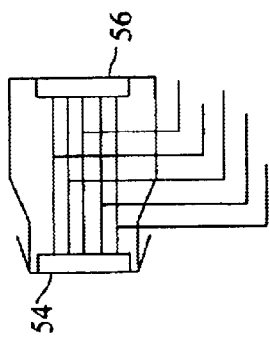
Figure 10E:
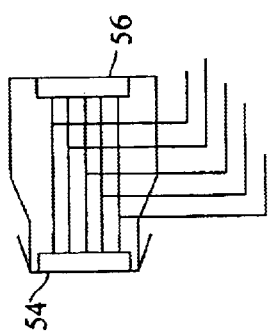
Figure 10F:
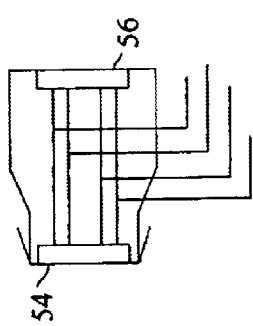

The power drop unit power tap connector 42 shown in FIG. 9 may be configured for an "A" circuit, as shown in FIG. 10a, by connecting cable wiring 48 to the pass through connectors 62 between the power input plug 54 and the power output socket 58.

The power drop unit power tap connector may be further configured, for example, for a "B" circuit (FIG. 10b), a "C" circuit (FIG. 10c), a "M" circuit (FIG. 10d), a "N" circuit (FIG. 10e), a "T" circuit (FIG. 10f), as well as other circuits.

The circuits described in FIGS. 8a–8f and in FIGS. 10a–10f are provided only as examples of potential configurations, and should not be construed in any way as limitations on the scope of the claimed invention. One should recognize that multiple additional wiring schemes are achievable by applying these teachings.

Further, to aid the installer in properly configuring and connecting cables for such a wide array of circuits, the power plug 54 and sockets 56, 58, along with the mating plugs and sockets of the power distribution system, may be color coded and keyed for specific circuit configurations and voltages/phases.

D. Connection of Electrical Device Assembly to Cable Assembly

As shown in FIGS. 11a–11e, the electrical device assembly connector plug 26 and the cable assembly connector socket 50 are configured in a complementary arrangement to connect the device wiring 24 to the cable wiring 48.

Figure 11B:
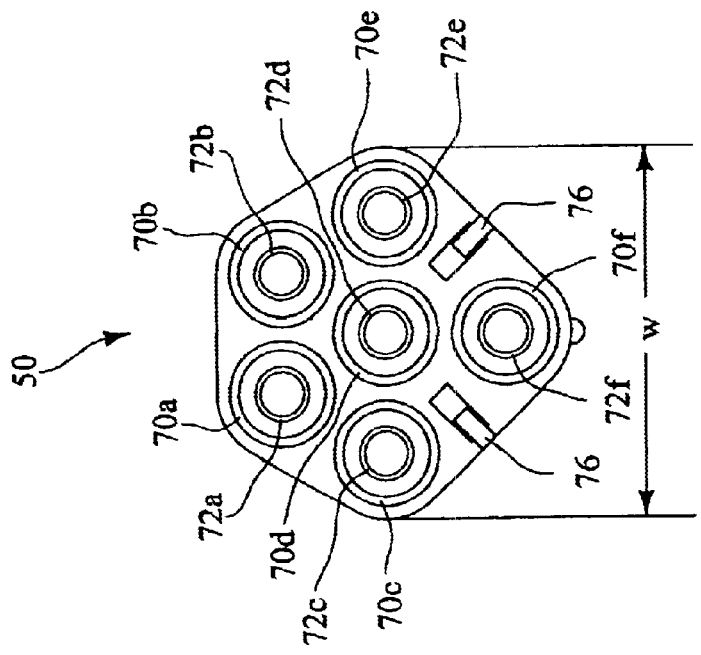
FIG. 11b is a front view of a connector plug of a cable assembly of the present invention.
Figure 11A:
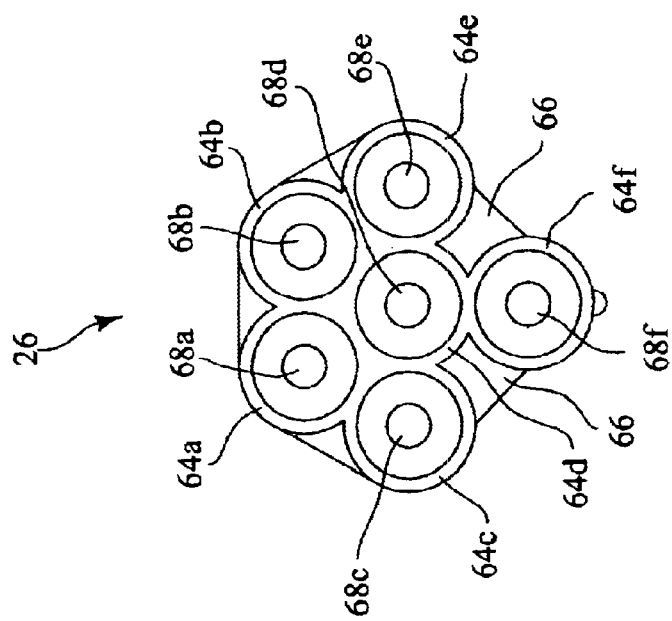
FIG. 11a is a front view of a connector socket of an electrical device assembly of the present invention.
Figure 11C:
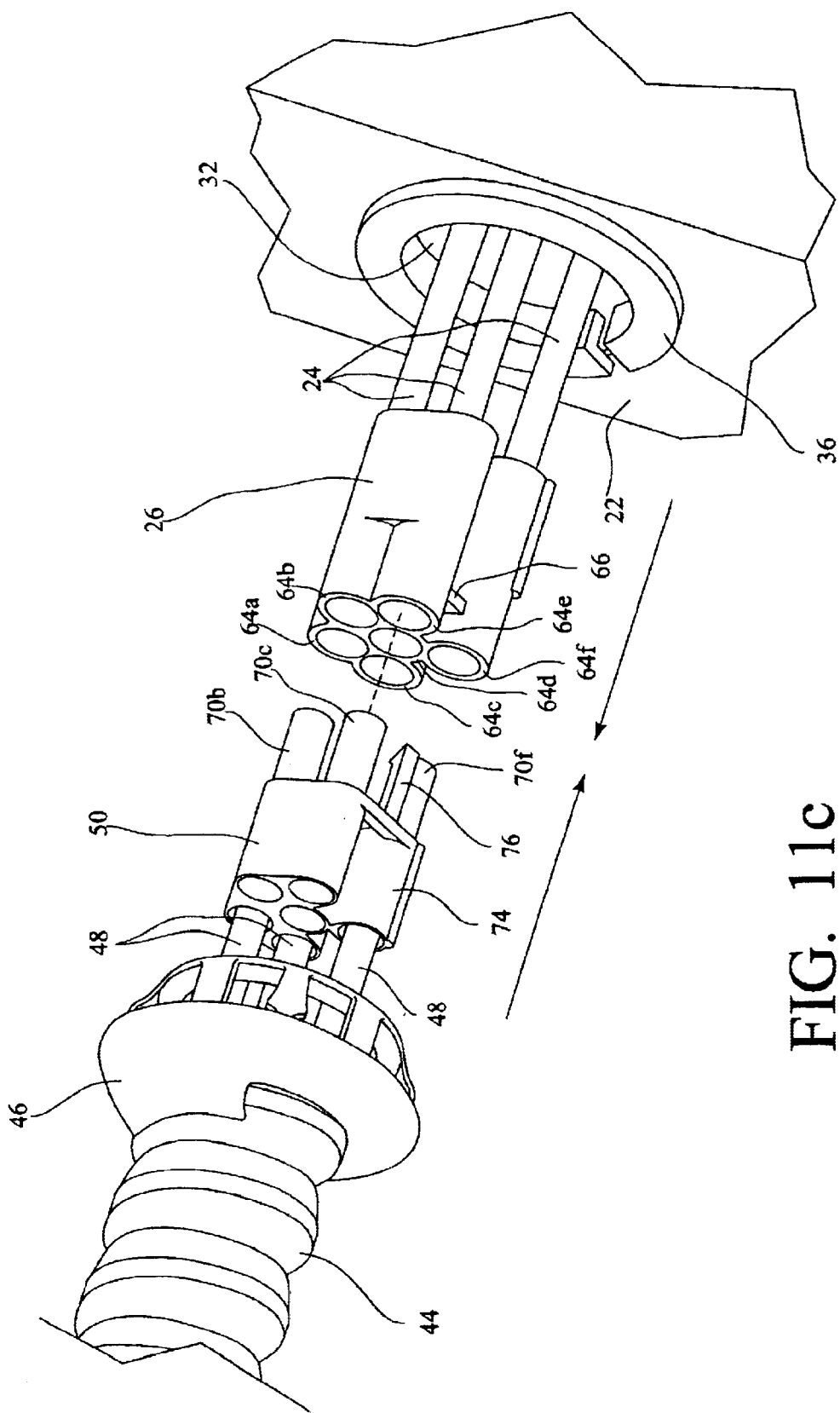
FIG. 11c is a partial perspective view of the connector socket/plug elements of FIGS. 11a and 11b.

As shown in FIGS. 11a and 11c, the connector plug 26 has six tubes 64a–64f clustered in a substantially hexagonal shaped (2-3-1) arrangement. The connector plug 26, as shown, may be formed from a plastic material, with the tubes molded together for support. Additionally, a rib 66 of material may be formed between either side of the lower tube 64f and the rest of the cluster. Each tube 64a–64f can receive one of the electrically conductive pins 68 operatively connected to the second ends of the device wiring 24, as mentioned earlier.

As shown in FIGS. 11b and 11c, connector socket 50 has six barrels 70a–70f arranged complementary in size and shape to the connector plug tubes 64a–64f such that the connector socket barrels 70a–70f may be received by the connector plug tubes 64a–64f.

Each barrel 70a–70f can receive an electrically conductive sleeve 72a–72f. The electrically conductive sleeves 72 are operatively connected to the second ends of the cable wiring 48. Further, each electrically conductive sleeve 72a–72f is sized to receive and electrically contact the connector plug pins 68a–68f.

Figure 11D:
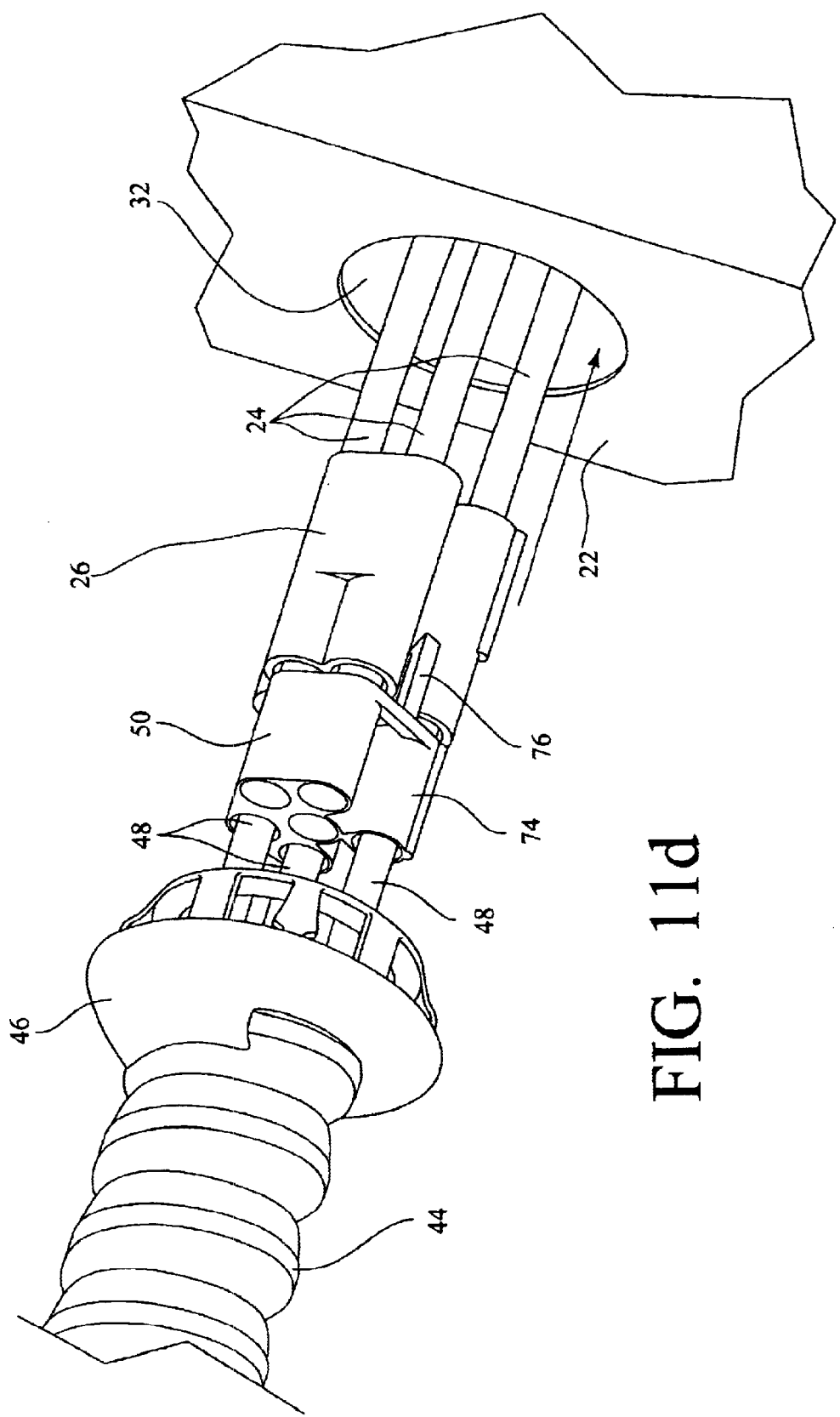
FIG. 11d is a partial perspective view of the connector socket/plug of FIG. 11c with the connector socket and connector plug connected.

Thus, as illustrated in FIGS. 11c and 11d, the electrical device assembly connector plug 26 may be connected to the cable assembly connector socket 50 such that the connector socket barrels 70a–70f are received within the connector plug tubes 64a–64f, and the connector plug pins 68a–68f are received by and make electrical contact with the connector socket sleeves 72a–72f. It should be understood that the socket barrels 70a–70f and the plug tubes 64a–64f, and/or the plug pins 68a–68f and the socket sleeves 72a–72f may be exchanged for each other while maintaining the same functionality, and, thus, would be equivalent to the structures specifically taught herein.

Figure 11E:
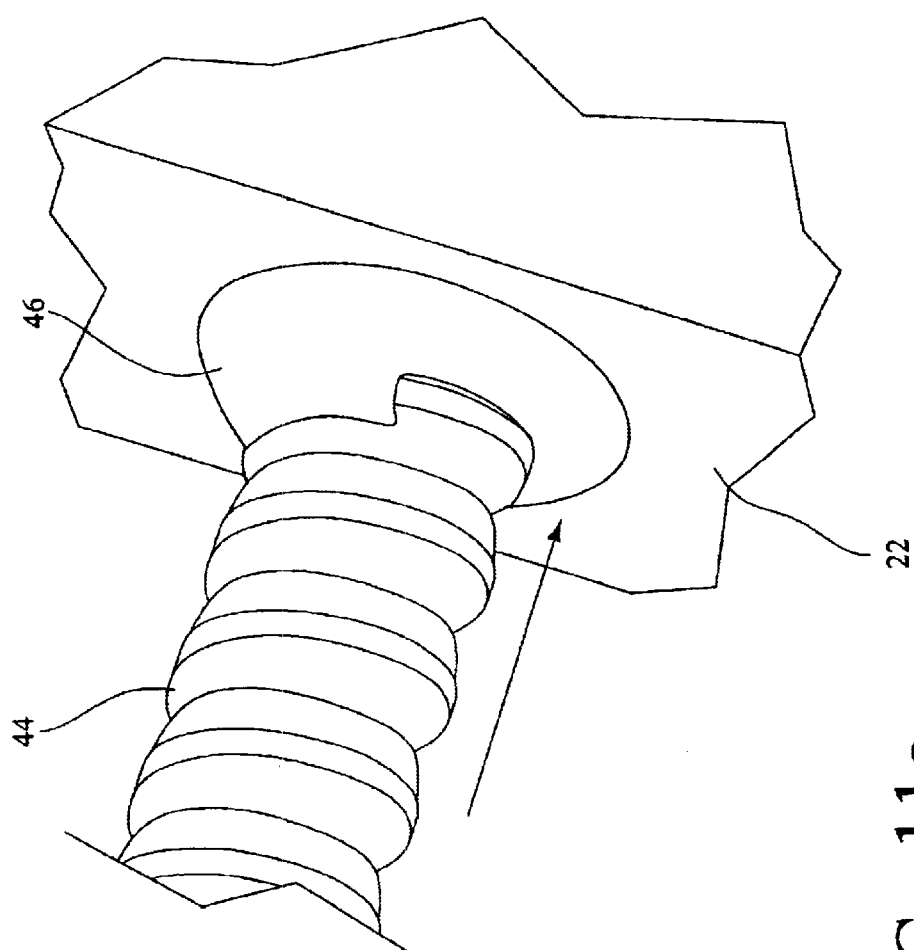
FIG. 11e is a partial perspective view of the cable assembly attached to the junction box according to the present invention.

The plug 26 and socket 50 are sized and arranged such that major width w (FIG. 11b) of the plug 26 and socket 50 combination is less than the diameter of the junction box knockout hole 32. Thus, as illustrated in FIGS. 11d and 11e, the assembled plug 26 and socket 50 combination may be pushed through the knockout hole 32 and into junction box 22 so that the knockout connector 46 of the cable assembly 12 can mate with the junction box knockout hole 32, thereby providing a unit completely encased in nonflammable material, preferably metal, in order to meet safety codes and standards. The split bushing 36 (FIG. 3) may be easily removed from the knockout hole 32 to allow the plug 26 and socket 50 combination to fit through the knockout hole, and to allow the knockout connector 46 to firmly mate with the junction box 12.

The connector socket barrels 70a–70f may be molded together along their base 74. Further, the connector socket 50 may be formed with a clasp 76 extending from its base 74 on either side of the lower barrel 70f. Thus, when the connector plug 26 and connector socket 50 are joined together, each socket clasp 76 will engage the corresponding plug rib 66 to hold the plug 26 and socket 50 together.

The exact electrical wiring of the connector socket 50 and the connector plug 26 will depend on the electrical configuration of the switch/power drop unit 10, but it should be recognized that the six separate conducting paths of the embodiment described herein enable the design of a multitude of electrical configurations.

Further, in the embodiment shown in the drawings, the hexagonal shaped (2-3-1) arrangement of the plug tubes 64a–64f and socket barrels 70a–70f permits only one mating orientation, ensuring that the appropriate pins 68a–68f are connected to their mating sleeves 72a–72f.

E. Expansion of the Switch/Power Drop Unit

Figure 12:
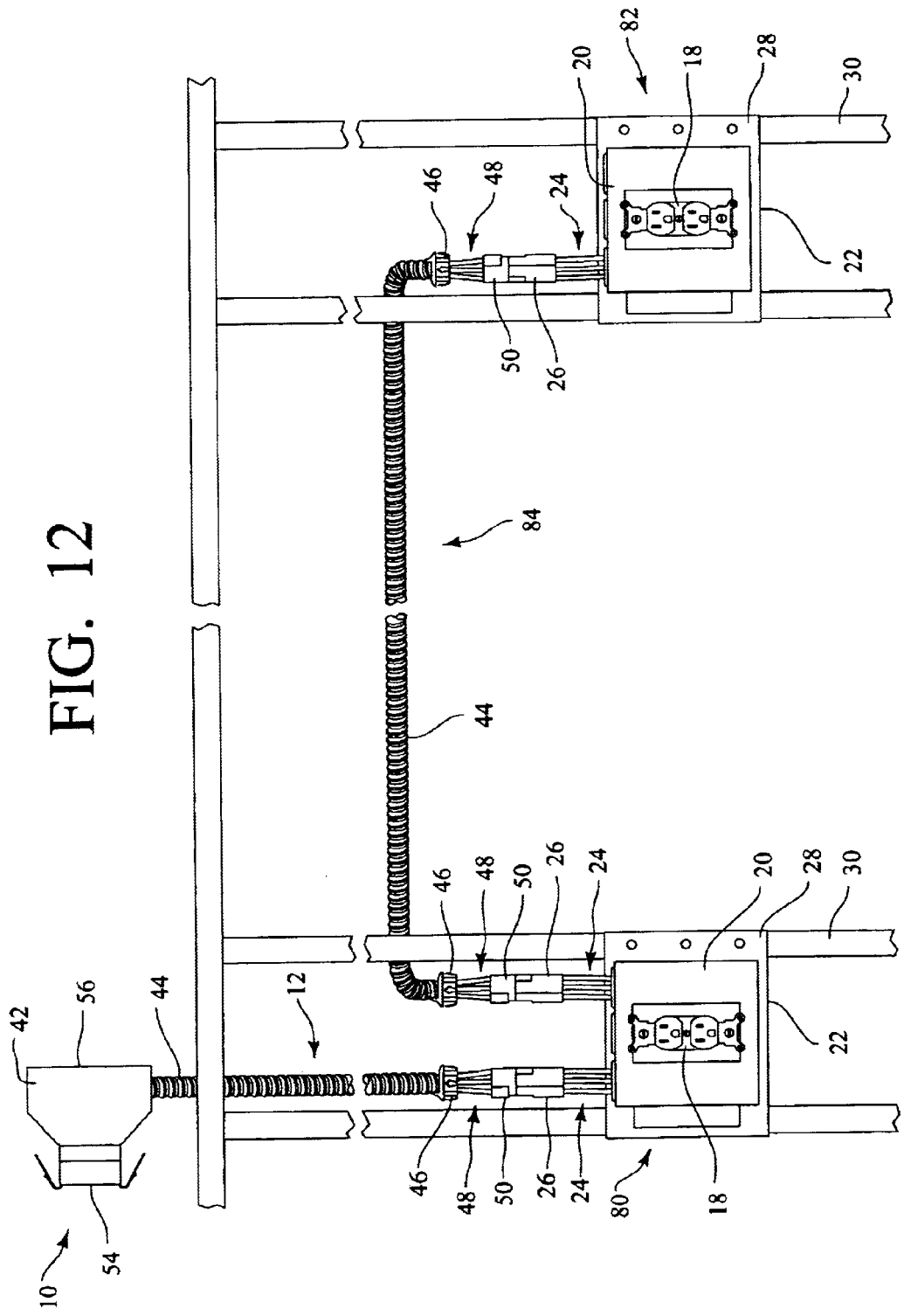
FIG. 12 is a front view of an expanded switch/power drop unit of the present invention.

As shown in FIG. 12, the switch/power drop unit 10 of the present invention provides great flexibility for expansion of the unit with additional electrical device assemblies 82.

For example, a first power drop unit electrical device assembly 80 may be configured with two connector plugs 26 appropriately connected to the device wiring 24 to provide electrical connectivity to a second power drop unit electrical device assembly 82 through an expansion cable assembly 84. Expansion cable assembly 84 has a connector socket 50 connected to the cable wiring 48, as well as a knockout connector 46, on each end of the expansion cable assembly 84. Flexible conduit cable 44 extends between the ends of the expansion cable assembly 84, as well. Thus, expansion cable assembly connector sockets 50 may be connected between the connector plugs 26 of the first power drop unit electrical device assembly 80 and the second power drop unit electrical device assembly 82. Then, the plug 26 and socket 50 combinations may be pushed through knockout holes 32 in their respective junction boxes 22, such that the knockout connectors 46 of the expansion cable assembly can mate with the knockout holes 32 to provide an expanded unit which is fully enclosed in nonflammable material.

Additional expansion is possible by ganging electrical device units together in order to more fully utilize the modular nature of the invention.

F. Protective Cover

Also shown in FIGS. 3 and 3a, the electrical device assembly 14 has a protective cover 38 which is attached to the front of the electrical device assembly 14 over the power receptacle 18. One aspect of the protective cover 38 is the exaggerated profile, seen in FIG. 3a. The exaggerated profile of the protective cover 38 simplifies the installation of wall material sheeting over the top of the electrical device assembly 14. For example, the protective cover 38 of a typical electrical device assembly 14 will extend at least 1" from the outer surface of the plaster ring cover 20. Thus, the electrical device assembly 14 will protrude outward from the plane defined by the outer surfaces of the bracket 28 and the stud 30 by an amount equal to the depth of the plaster ring cover 20 plus the depth of the protective cover 38. Since the wall material sheet will also be attached to the stud 30, it will necessarily bulge outward at the location of the electrical device assembly 14. The material of the protective cover 38 is selected to resist cutting tools such as saws and routers. In a typical embodiment, a sheet metal material will suffice to accomplish this purpose. Thus, installation of the wall material panels may be completed by locating the bulge, cutting through the wall material until the protective cover 38 is struck. Then, the wall material may be cut radially outward until an edge of the protective cover 38 is located, at which point a hole in the wall material may be opened by cutting around the peripheral edges of the protective cover 38. Thus, the hole in the wall material for access to the power receptacle 18 can be created in the wall material without the additional steps of measuring or marking the location of the power receptacle 18.

The protective cover 38 may be left on the electrical device assembly during any additional construction or finishing of the room in order to protect the power receptacle 18. When the user is ready to utilize the power receptacle 18, the protective cover 38 may then be easily removed and disposed of, and a decorative plate (not shown) installed to finish the installation. No additional wiring is needed.

This description of the invention, including specific dimensions and materials, shall not be construed as a limitation of any invention hereafter claimed by the inventors, as it will be readily apparent to those skilled in the art that design choices may be made changing the configuration of the switch/power drop unit without departing from the spirit or scope of the invention.

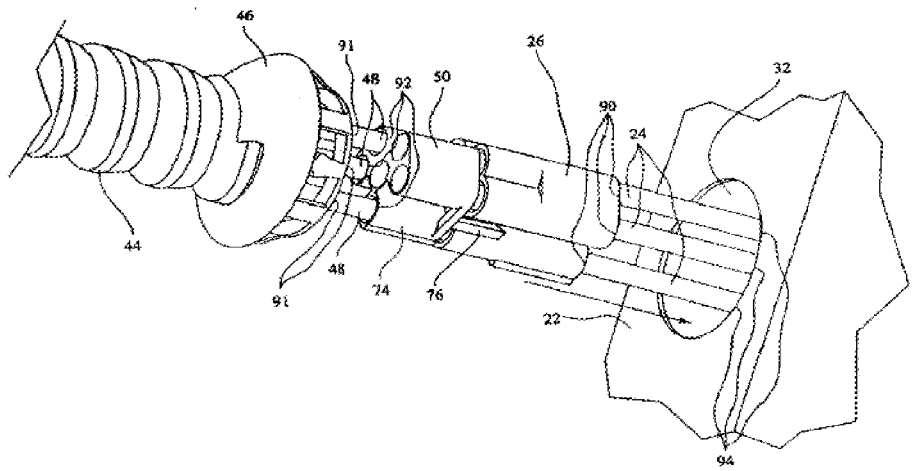

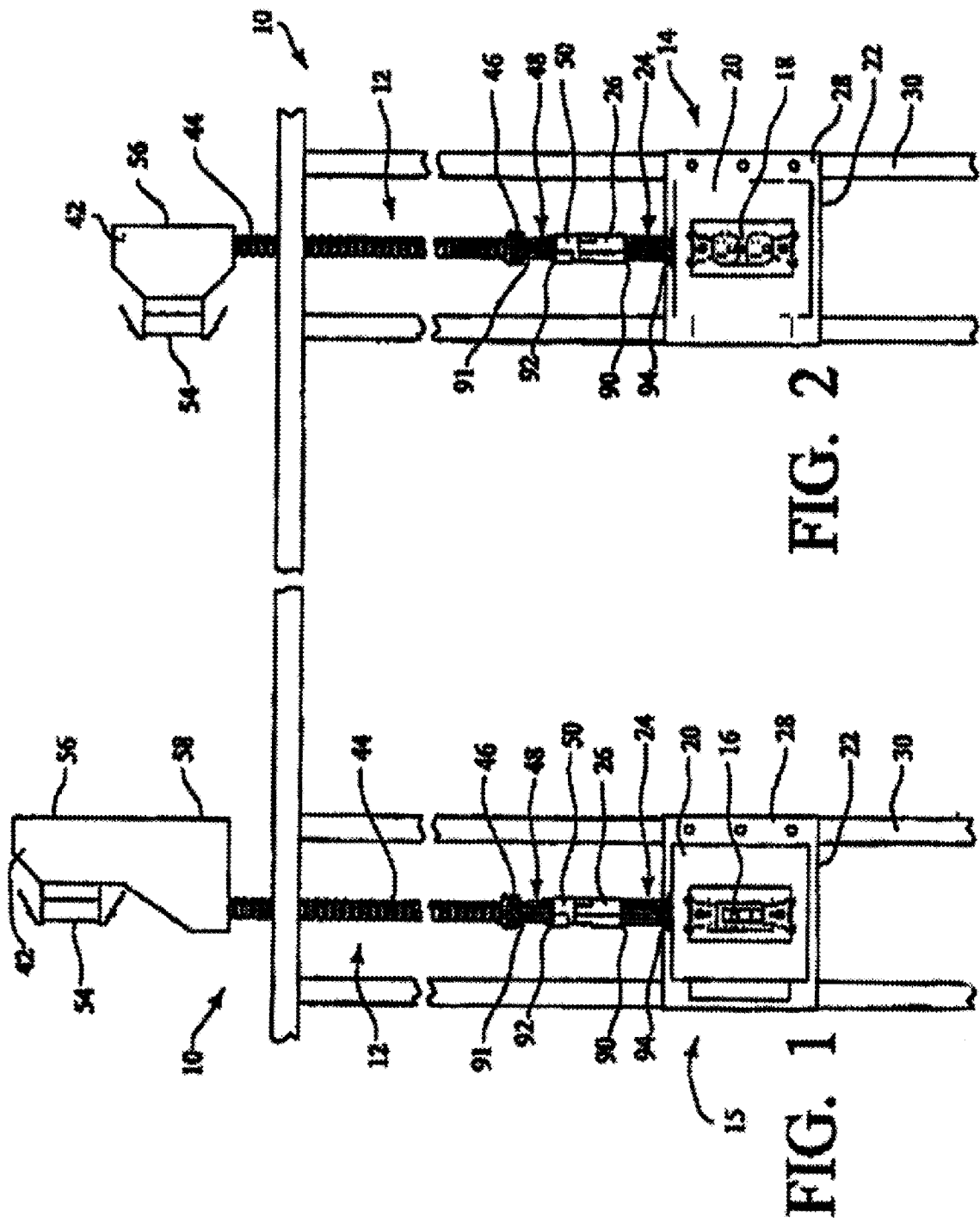

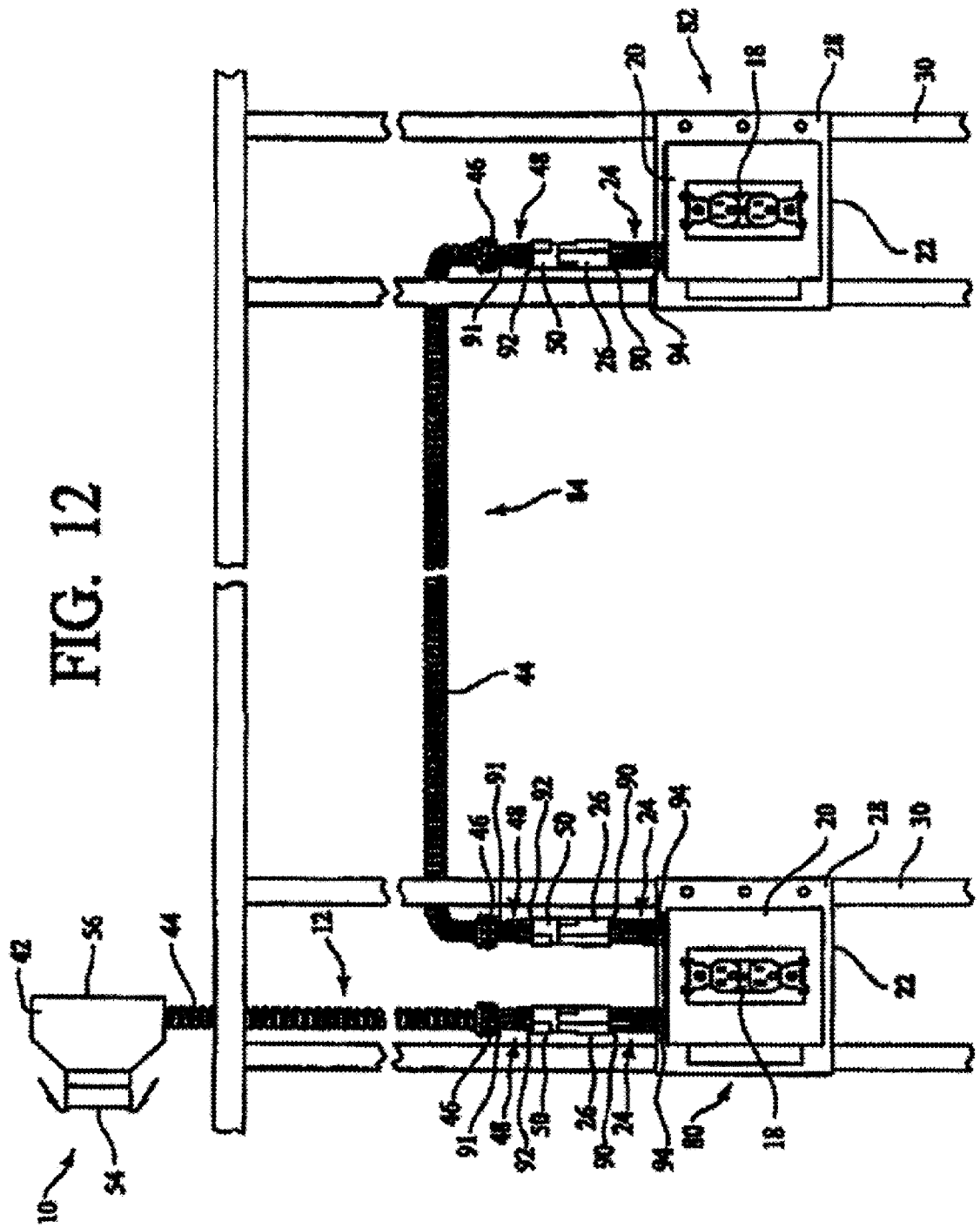

What is claimed is:

1. A connector assembly for insertion into a knockout hole of a junction box wherein said knockout hole has a predetermined diameter, said connector assembly comprising:
   a connector plug having a plurality of tubes arranged in a cluster such that a major width of said connector plug is less than said junction box knockout hole diameter; and
   a connector socket having a plurality of barrels sized to be received within said connector plug tubes, said connector socket barrels arranged in a cluster complementary to said connector plug tube cluster and such that a major width of said connector socket is less than said junction box knockout hole diameter.

2. The connector assembly of claim 1 further comprising electrically conductive pins and electrically conductive sleeves, said sleeves being sized to receive and contact said electrically conductive pins, each said tube receiving one of said electrically conductive pins, each said barrel receiving one of said electrically conductive sleeves.

3. The connector assembly of claim 2 further comprising device wiring and cable wiring, said device wiring having first ends and opposed second ends, said device wiring second ends operatively connected to said electrically conductive pins, said cable wiring having first ends and opposed second ends, said cable wiring second ends operatively connected to said electrically conductive sleeves.

4. The connector assembly of claim 1 wherein said connector plug tubes are arranged in a substantially hexagonal shaped cluster, wherein said connector plug further has at least one rib of material formed between one of said tubes and the rest of the cluster, and wherein said connector socket further has a clasp positioned to engage said connector plug rib upon connection of said connector plug and said connector socket.

5. An assembly for connecting a pre-wired electrical device into a modular wiring system, said assembly comprising:
an electrical device assembly having:
a junction box having a knockout hole formed therein, said knockout hole having a predetermined diameter, said junction box being made of a nonflammable material;
an electrical device mounted substantially within said junction box;
device wiring having first ends and opposed second ends, said device wiring first ends operatively connected to said electrical device, said device wiring extending through said knockout hole;
electrically conductive pins operatively connected to said device wiring second ends; and
a connector plug having a plurality of tubes arranged in a cluster such that a major width of said connector plug is less than said junction box knockout held hole diameter, each said tube receiving one of said electrically conductive pins; and
a cable assembly having:
a power tap connector configured to mateably connect with said modular wiring system, said power tap connector having an outer housing, said outer housing being made of a nonflammable material;
cable wiring having first ends and opposed second ends, said cable wiring first ends operatively connected to said power tap connector, said cable wiring extending from said power tap connector;
a flexible conduit sheath having a first end and an opposed second end, said flexible conduit sheath first end mechanically connected to said power tap connector outer housing, said cable wiring extending through said flexible conduit sheath, said flexible conduit sheath being made of a nonflammable material; and
a knockout connector for connecting said flexible conduit sheath to said junction box at said knockout hole, said knockout connector connected to said flexible conduit sheath second end, said knockout connector being made of a nonflammable material;
electrically conductive sleeves operatively connected to said cable wiring second ends, said sleeves being sized to receive and contact said electrically conductive pins of said electrical device assembly; and
a connector socket having a plurality of barrels sized to be received within said connector plug tubes, said connector socket barrels arranged in a cluster complementary to said connector plug tubes and such that a major width of the connector socket is less than said junction box knockout hole diameter, each said barrel receiving one of said electrically conductive sleeves.

6. The assembly of claim 5 wherein said electrical device assembly further comprises a bushing covering the edges of said knockout hole.

7. The assembly of claim 5 wherein said electrical device assembly further has a plaster ring cover attached to said junction box, wherein said electrical device is attached to said plaster ring cover.

8. The assembly of claim 7 wherein said electrical device assembly further has a protective cover attached to said electrical device assembly over said electrical device.

9. The assembly of claim 8 wherein said protective cover extends greater than about one inch from said plaster ring cover, and wherein said protective cover is made of a material that is resistant to incidental contact with a cutting tool.

10. The assembly of claim 9 wherein said cutting tool contact resistant material is sheet metal.

11. An assembly for connecting a pre-wired electrical device into a modular wiring system, said assembly comprising:
an electrical device assembly having:
a junction box having sides, a closed back, and an open front, said sides having a knockout hole formed therein, said knockout hole having a predetermined diameter, said junction box being made of a nonflammable material;
a bushing covering the edges of said knockout hole;
an electrical device mounted substantially within said junction box, said electrical device having a plurality of electrical connection terminals;
device wiring having a plurality of electrically conductive wires, each of said wires having a first end and a second end, each said first end operatively connected one of said electrical device connection terminals, said wires extending through said knockout hole;
a plurality of electrically conductive pins, each said pin operatively connected to one of said second ends of said electrically conductive wires; and
a connector plug having a plurality of tubes arranged in a cluster such that the major width of the connector plug is less than the junction box knockout hole diameter, each said tube receiving one of said electrically conductive pins; and
a cable assembly having:
a power tap connector configured to mateably connect with said modular wiring system, said power tap connector having an outer housing, said outer housing being made of a nonflammable material;
a flexible conduit cable having:
a flexible conduit sheath having a first end and a second end, said flexible conduit sheath first end being mechanically connected to said power tap connector, said flexible conduit sheath being made of a nonflammable material; and
cable wiring having a plurality of electrically conductive wires, each of said wires having a first end portion, an opposing second end portion, and a middle portion therebetween, said middle portions running through said outer flexible conduit sheath, each of said cable wire first end portions extending from said sheath first end into said power tap connector and being operatively connected to said power tap connector, each of said cable wire second ends extending from said sheath second end;
a knockout connector for connecting said flexible conduit sheath to said junction box at said knockout hole, said knockout connector connected to said outer flexible conduit sheath second end, said knockout connector being made of a nonflammable material;
a plurality of electrically conductive sleeves operatively connected to one of said second end portions of said electrically conductive wires of said cable wiring, each said sleeve being sized to receive and electrically contact said electrically conductive pins of said electrical device assembly; and
a connector socket having a plurality of barrels arranged in a cluster such that the major width of the connector socket is less than the junction box knockout hole diameter, each said barrel receiving one of said electrically conductive sleeves.

* * * * *

UNITED STATES PATENT AND TRADEMARK OFFICE
CERTIFICATE OF CORRECTION

PATENT NO. : 6,777,611 B2
APPLICATION NO. : 10/193954
DATED : August 17, 2004
INVENTOR(S) : Michael Ewald and Eddie Tucker It is certified that error appears in the above-identified patent and that said Letters Patent is hereby corrected as shown below:

Delete Drawing sheets 1-7, and substitute therefor the Drawing sheets, consisting of figs. 1-12, as shown on the attached pages.

Column 3, line 31, delete "an" from "is an top view..."
Column 5, line 34, add "91" to "first end"
Column 5, line 37, add "92" to "second end"
Column 6, line 10, "output socket" should be "56"
Column 6, line 43, "92" should be after "second ends"
Column 6, line 52, "92" should be after "second ends"
Column 7, line 15, "jnction box 12" should be "junction box 22"

Signed and Sealed this

Third Day of February, 2009

JOHN DOLL
*Acting Director of the United States Patent and Trademark Office*

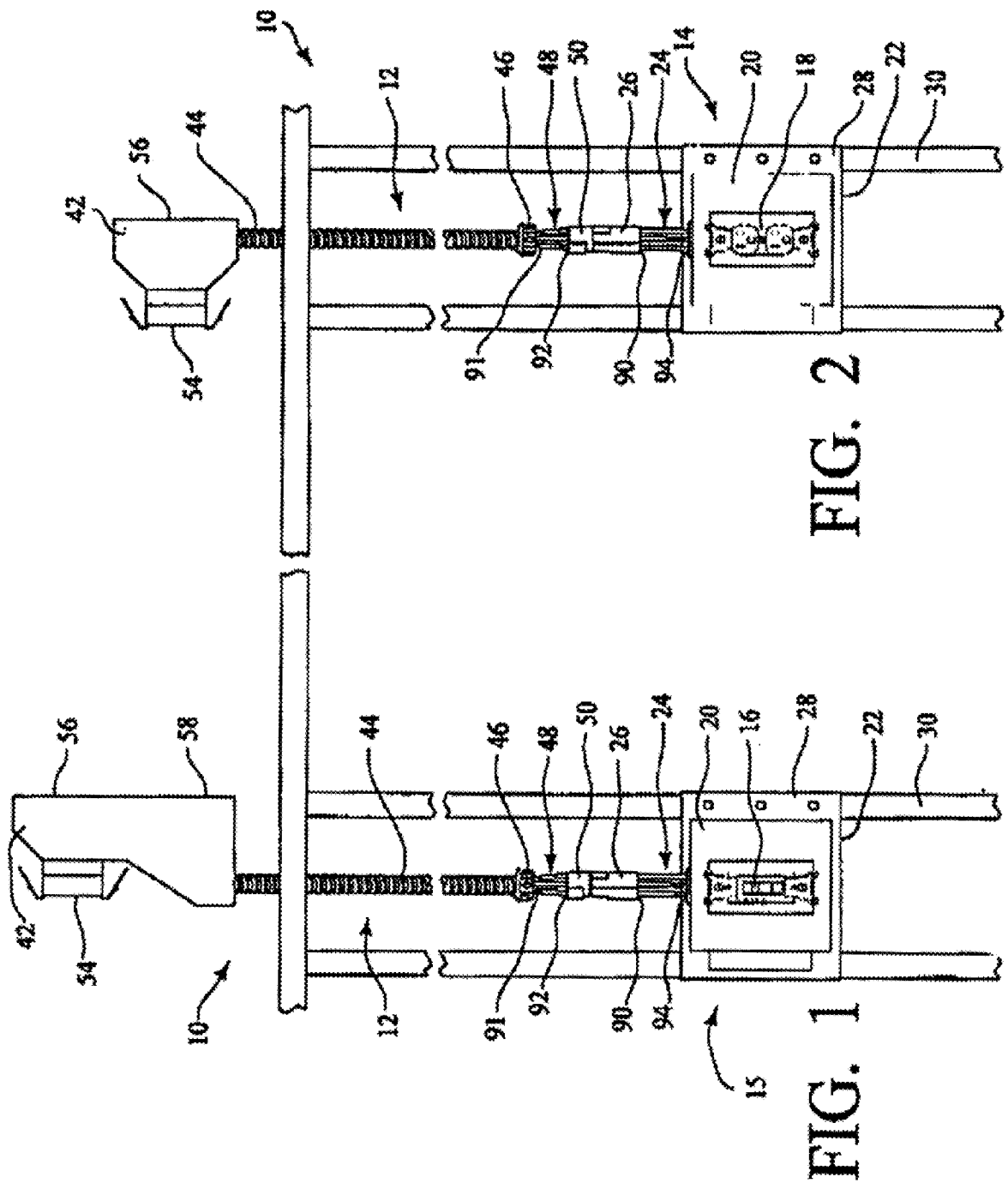

UNITED STATES PATENT AND TRADEMARK OFFICE
CERTIFICATE OF CORRECTION

PATENT NO. : 6,777,611 B2
APPLICATION NO. : 10/193954
DATED : August 17, 2004
INVENTOR(S) : Michael Ewald and Eddie Tucker It is certified that error appears in the above-identified patent and that said Letters Patent is hereby corrected as shown below:

Delete the title page and substitute therefor the attached title page.

Delete Drawing sheets 1, 2, 5, 6, 12, 13, and 15, and substitute therefor the Drawing sheets 1, 2, 5, 6, 12, 13, and 15, as shown on the attached pages.

Column 3, line 31, delete "an" from "is an top view..."
Column 5, line 34, add "91" to "first end"
Column 5, line 37, add "92" to "second end"
Column 6, line 10, "output socket" should be "56"
Column 6, line 43, "92" should be after "second ends"
Column 6, line 52, "92" should be after "second ends"
Column 7, line 15, "jnction box 12" should be "junction box 22"

This certificate supersedes the Certificate of Correction issued February 3, 2009.

Signed and Sealed this

Twenty-fourth Day of February, 2009

JOHN DOLL
*Acting Director of the United States Patent and Trademark Office*

(12) United States Patent
Ewald et al.

(10) Patent No.: US 6,777,611 B2
(45) Date of Patent: Aug. 17, 2004

(54) SWITCH/POWER DROP UNIT FOR MODULAR WIRING SYSTEM

(75) Inventors: Michael D. Ewald, Tupelo, MS (US); Eddie Tucker, Jr., Tupelo, MS (US)

(73) Assignee: Genlyte Thomas Group LLC, Louisville, KY (US)

( * ) Notice: Subject to any disclaimer, the term of this patent is extended or adjusted under 35 U.S.C. 154(b) by 0 days.

(21) Appl. No.: 10/193,954

(22) Filed: Jul. 11, 2002

(65) Prior Publication Data
US 2003/0010520 A1 Jan. 16, 2003

Related U.S. Application Data
(60) Provisional application No. 60/304,506, filed on Jul. 11, 2001.

(51) Int. Cl.[7] .................................................. H02G 3/08
(52) U.S. Cl. ........................ 174/50; 174/48; 174/58; 174/59; 220/3.8; 439/681
(58) Field of Search .......................... 174/48, 50, 59, 174/58, 60; 439/681, 680, 358; 220/3.8, 402; 248/906

(56) References Cited

U.S. PATENT DOCUMENTS

| | | |
|---|---|---|
| 3,144,502 A | 8/1964 | Weiss |
| 3,647,934 A * | 3/1972 | Hurtt ........................ 174/65 R |
| 3,648,878 A | 3/1972 | Mackay et al. |
| 3,715,627 A | 2/1973 | D'Ausilio |
| 4,003,573 A | 1/1977 | Martin |
| 4,043,629 A | 8/1977 | Brannen |
| 4,146,287 A | 3/1979 | Jonsson |
| 4,272,689 A | 6/1981 | Crosby et al. |
| 4,367,417 A | 1/1983 | Casasanta |
| 4,399,371 A | 8/1983 | Ziff et al. |
| 4,500,796 A | 2/1985 | Quin, deceased |
| 4,686,381 A | 8/1987 | Boteler et al. |
| 4,842,551 A | 6/1989 | Heimann |
| 4,875,871 A | 10/1989 | Booty, Sr. et al. |
| 4,918,258 A | 4/1990 | Ayer |
| 4,924,032 A | 5/1990 | Akins |
| 4,958,048 A | 9/1990 | Bell |
| 5,057,647 A | 10/1991 | Hogden et al. |
| 5,064,385 A | 11/1991 | Harlow, Jr. |
| 5,096,433 A | 3/1992 | Boundy |
| 5,149,277 A | 9/1992 | LeMaster |
| 5,164,544 A | 11/1992 | Snodgrass et al. |
| 5,375,728 A | 12/1994 | West |
| 5,675,194 A | 10/1997 | Domigan |
| 5,679,023 A | 10/1997 | Anderson, Jr. et al. |
| 5,785,548 A * | 7/1998 | Capper et al. ............... 439/409 |
| 5,785,551 A | 7/1998 | Libby |
| 5,811,730 A | 9/1998 | Rintz |
| 5,819,405 A | 10/1998 | Marder et al. |
| 5,902,960 A | 5/1999 | Smith |
| 5,936,199 A | 8/1999 | Lutz |
| 6,102,733 A | 8/2000 | Anderson, Jr. et al. |
| 6,166,329 A * | 12/2000 | Oliver et al. ................. 174/58 |
| 6,383,032 B1 * | 5/2002 | Gerberding ................. 439/681 |

* cited by examiner

*Primary Examiner*—Dhiru R Patel
(74) *Attorney, Agent, or Firm*—Suzan J. Hixon; Middleton Reutlinger

(57) ABSTRACT

An assembly for connecting a pre-wired electrical device into a modular wiring system. The electrical device is mounted in a junction box having a knockout hole. Device wiring connects the electrical device through the knockout hole to a connector plug. Cable wiring connects a modular wiring system power tap connector to a connector socket. The cable wiring runs through a flexible conduit sheath. A knockout connector is connected to the flexible conduit sheath. The connector plug connects to the connector socket. The major width of the connector plug/socket combination is less than the diameter of the knockout hole such that the connector plug/socket combination may be pushed into the junction box through the knockout hole. The knockout connector can then be attached to the junction box at the knockout hole. The power tap connector housing, flexible conduit sheath, knockout connector and junction box are all made of nonflammable materials.

11 Claims, 15 Drawing Sheets